FIG. 3 TEST EQUIPMENT

INVENTOR.
LEON H. REAGAN

FIG. 4 TEST EQUIPMENT

June 25, 1957 — L. H. REAGAN — 2,797,268
KEY SENDER TEST CIRCUIT
Filed Oct. 28, 1952 — 12 Sheets-Sheet 6

SENDER

INVENTOR.
LEON H. REAGAN
BY
ATTORNEY

FIG. 7    SENDER

INVENTOR.
LEON H. REAGAN

June 25, 1957   L. H. REAGAN   2,797,268
KEY SENDER TEST CIRCUIT
Filed Oct. 28, 1952   12 Sheets-Sheet 12

| FIG. 2 | FIG. 3 | FIG. 4 | FIG. 5 | FIG. 6 | FIG. 7 | FIG. 8 | FIG. 9 | FIG. 10 | FIG. 11 | FIG. 12 |
|--------|--------|--------|--------|--------|--------|--------|--------|---------|---------|---------|

INVENTOR.
LEON H. REAGAN
BY
ATTORNEY

United States Patent Office 2,797,268
Patented June 25, 1957

2,797,268

KEY SENDER TEST CIRCUIT

Leon H. Reagan, Richland, Wash., assignor, by mesne assignments, to General Dynamics Corporation, a corporation of Delaware Application October 28, 1952, Serial No. 317,286

19 Claims. (Cl. 179—175.23)

This invention relates to testing devices for use in connection with a telephone system register-sender, the register-sender being of the type shown and described in my copending application, Serial No. 311,845, filed September 27, 1952, now Patent No. 2,730,568.

Most electro-mechanical telephone equipment is adapted to be controlled by a series of directive pulses, of which each series is representative of a particular digit. These control pulses may be produced by many different devices, such as a conventional telephone dial or by more complicated apparatus, a register-sender, for example. Usually, the register-sender is used where time is a controlling factor. For example, an intertoll operator may be required to transmit many digit indications, eleven series of pulse trains, for instance, which she may do by means of a register-sender before the completion of the actual pulse transmission over an outgoing trunk. In standard practice, each operator position has access to such a register-sender.

As in the case of all electro-mechanical equipment, periodical maintenance is required; therefore it would be highly desirable to provide a maintenance man with equipment of such flexibility as to reproduce all conditions encountered in actual practice. This invention is directed toward a testing device and is arranged to be substituted for any operator's position. Various schemes of substitution may be provided, such as mechanical switching, or the like; however, my testing device is preferably housed in a portable arrangement so that the test equipment may be carried to any register-sender where a patching cord may be used to interconnect the test equipment and register-sender.

One object of my invention is to provide an inexpensive testing device for determining the condition of a register-sender.

Another object of this invention is to provide a test device which may simulate exactly all conditions met by the register-sender in actual practice.

Still another object of this invention is to provide a removable connection by which any register-sender may be disconnected from the equipment which it normally serves and connected with testing equipment.

A further object of my invention is to provide a test circuit of such a simple character as to make it readily adaptable to portability so that the test circuit may be carried to any register-sender thereby providing a simple means for substitution.

A still further object of my invention is to provide means for simulating key set operations of an intertoll operator position.

Yet another object of my invention is to provide means for simulating all features of an out-dial trunk circuit.

Another object of this invention is to simulate hook-switch supervision.

An additional object is to provide a digit indicator which displays a signal indicative of the number of digit pulses which were actually transmitted.

Still another object of this invention is to selectively operate performance lamps which indicate all sender functions.

Other objects will be obvious from the accompanying drawings which are designed to teach one skilled in the art when studied together with the following specification. As in the case of most telephone equipment, the positive terminal of the exchange battery may be connected with ground. Throughout the specification and in the drawing, this grounded potential is shown by a (+) sign while the negative pole of the battery conveniently may be the standard 48 volt connection. This is shown in the specification and drawing as a (—) sign.

Fig. 1 shows a block diagram illustrating the manner in which the test equipment may be connected into a standard circuit;

Figs. 2, 3 and 4, when properly joined together, show a test circuit which may be connected to a register-sender by means of a patching cord;

Figs. 11 and 12 show a pickup chain and a counting chain which is controlled from the register circuit to indicate to the sender circuit how many outgoing digit pulses are to be transmitted in each case; and Fig. 13 shows the manner in which Figs. 2–12 are to be joined so that a complete and operative circuit is shown.

Figure 1:
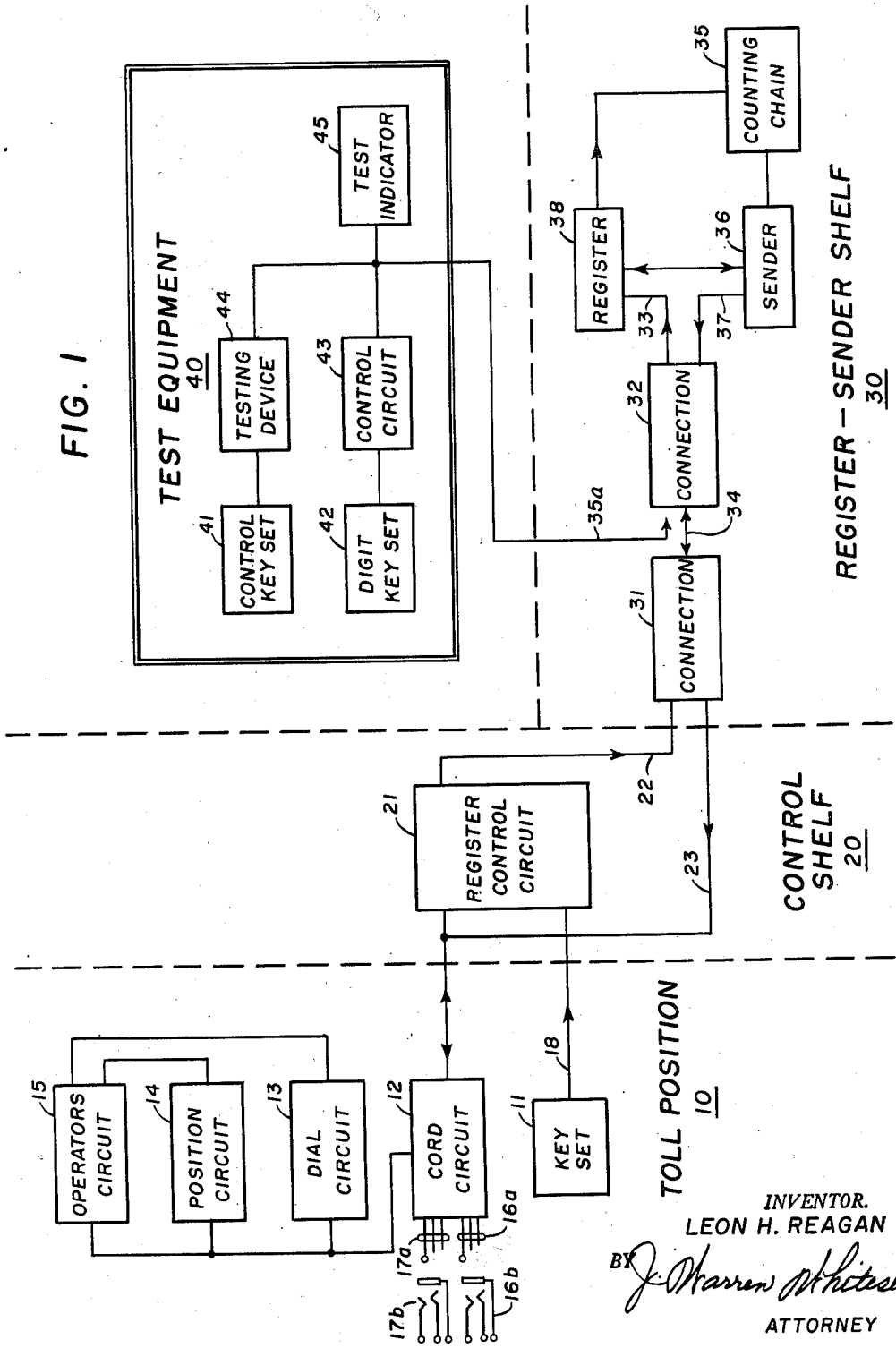

Referring briefly to Fig. 1, there is seen an operator's toll position 10 which has access to a control shelf 20. The control shelf terminates in a removable connection 31 that may be any suitable device which is adapted to provide a readily interchangeable feature by which various register-senders may be substituted at will. For example, connection 31 may be a simple jack-like arrangement into which a suitable patching cord 34 may be removably fitted. Patching cord 34 interconnects control shelf 20 with a register-sender shelf 30 by means of another removable connection 32 which also may be a simple jack-like arrangement, for example. Testing equipment 40 is also provided with a patching cord 35a which may be substituted for patching cord 34 thereby connecting register-sender shelf 30 with testing equipment 40.

More specifically, toll position 10 is provided with a cord circuit 12 terminating in a plug 16a which may be inserted into a jack 16b to answer any incoming call which may have originated either in the exchange local to toll position 10 or in a distant exchange. Cord circuit 12 is also provided with a calling plug 17a which may be connected with jack 17b to place an outgoing call to any desired point. The toll operator is provided with dial circuit 13, position circuit 14 and operator's circuit 15 by means of which she may perform any of those functions which are required of an operator. For example, she may operate key set 11 to register any desired digit indications or she may perform certain auxiliary functions, such as controlling the application of automatic ringing, cancelling registered digits and the like. Key set 11 operates a register control circuit 21 over conductors indicated by cable 18 and the register control circuit 21 in turn extends the keyed indications over cable 22, connection 31, patching cord 34, connection 32 and cable 33 to register 38 where an indication is stored which is indicative of the digit transmitted by the operator at toll position 10 through the use of her key set 11. This stored indication serves to control counting chain 35 and sender 36. Counting chain 35 steps in search of the stored digit indication, and on each step sender 36 transmits an outgoing digit impulse over cable 37, connection 32, patching cord 34, connection 31 and cable 23 to cord circuit 12, calling plug 17a and jack 17b.

If a maintenance man should wish to make any test as to the proper functioning of register 38, counting chain 35 and sender 36, he will disconnect patching cord 34—hence toll position 10 and control shelf 20—and substitute therefor testing equipment 40 which now may be connected by means of patching cord 35a, connection 32 and cable 33. Testing equipment 40 is provided with a control key set 41 and a digit key set 42. Digit key set 42 operates a control circuit 43 which simulates the function of register-control circuit 21 while control key set 41 operates testing device 44 to simulate various conditions which may be encountered in actual practice, either at toll position 10 or more remotely from equipment connected to either of the jacks 16b or 17b. Test indicator 45 provides a means by which a maintenance man may ascertain the results of each test as it is performed.

Figure 2:
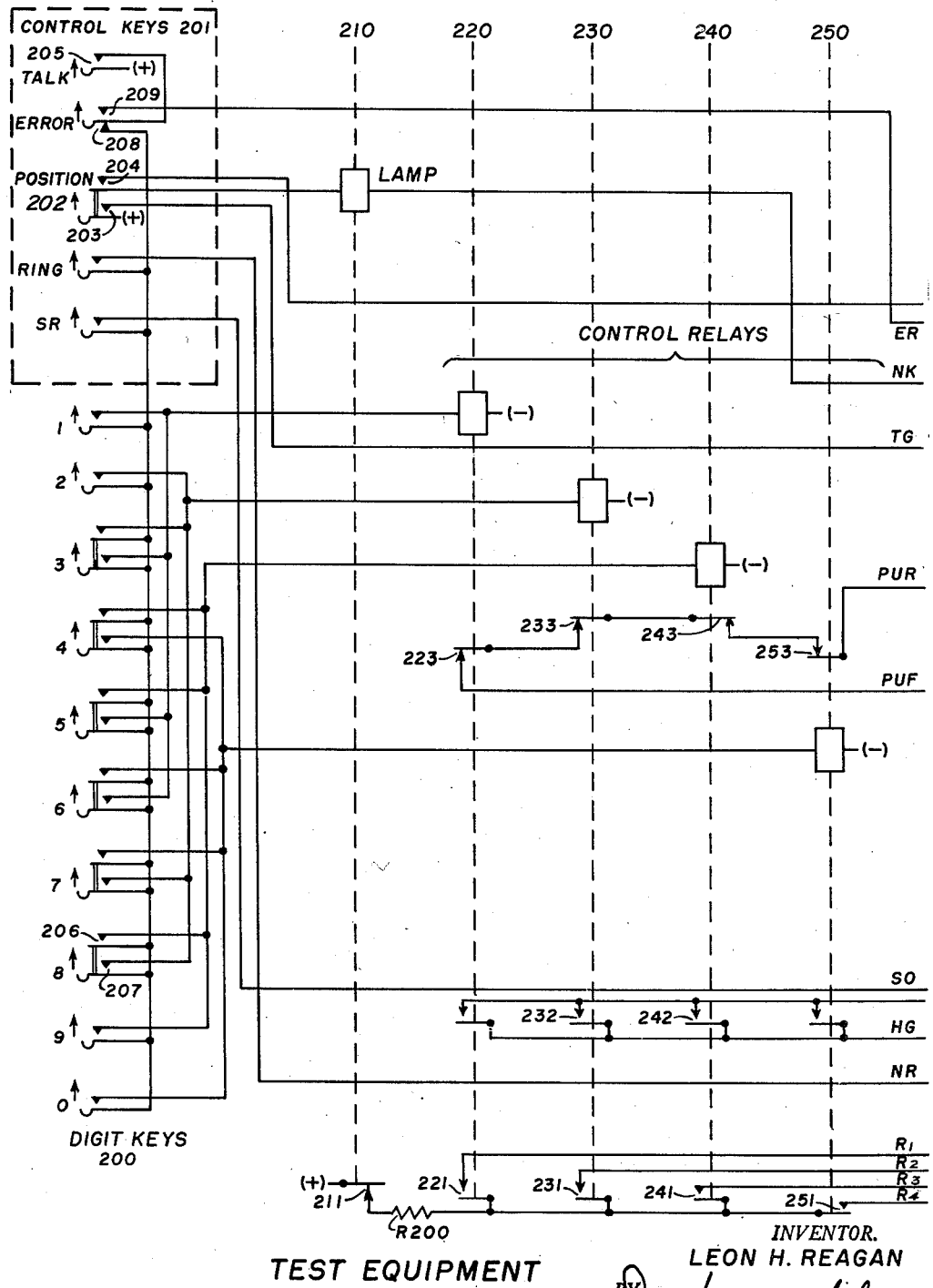
Figure 3:
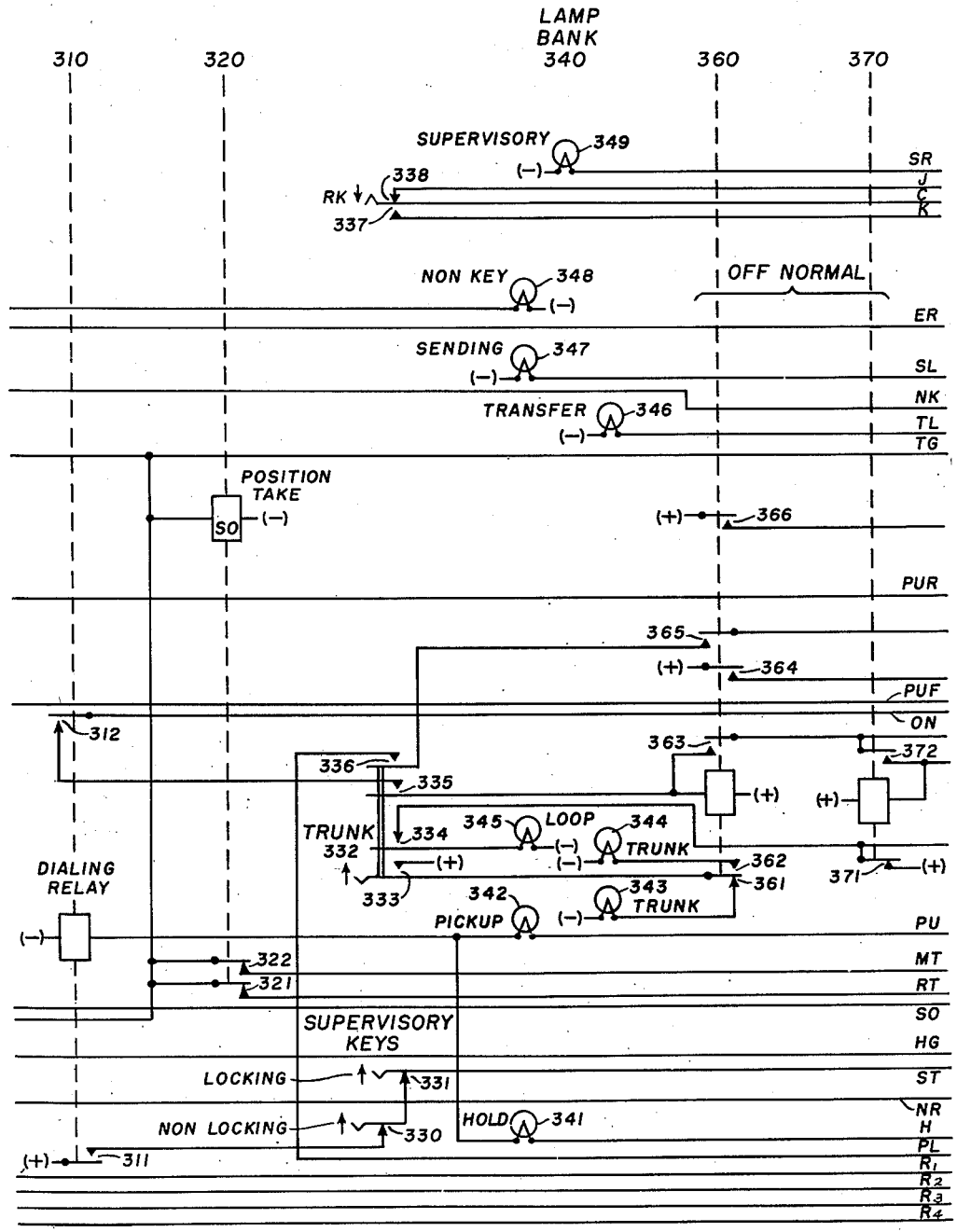
Figure 4:
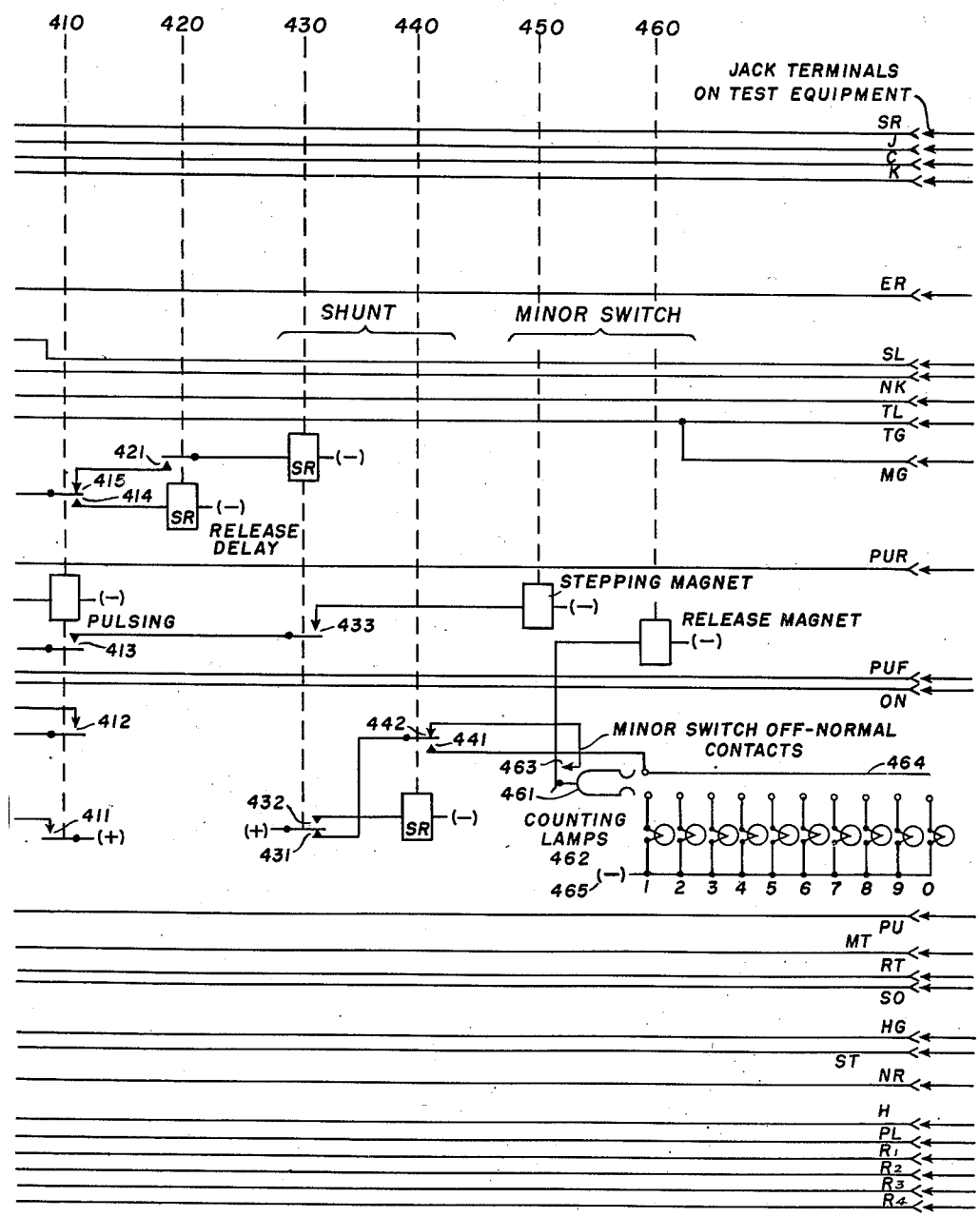
Figure 5:
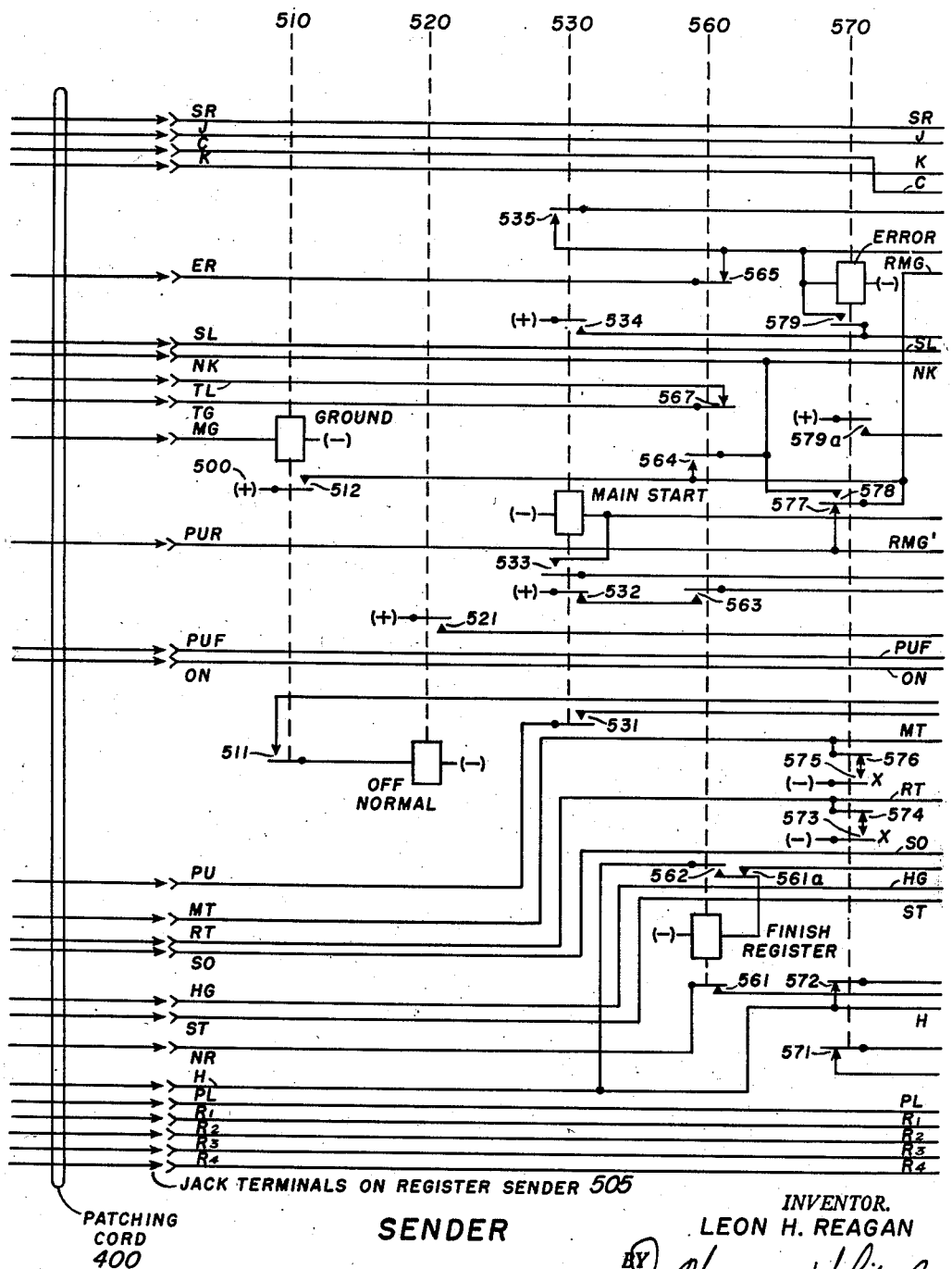
Figs. 5, 6, 7 and 8 show the sender portion of a register-sender.
Figure 6:
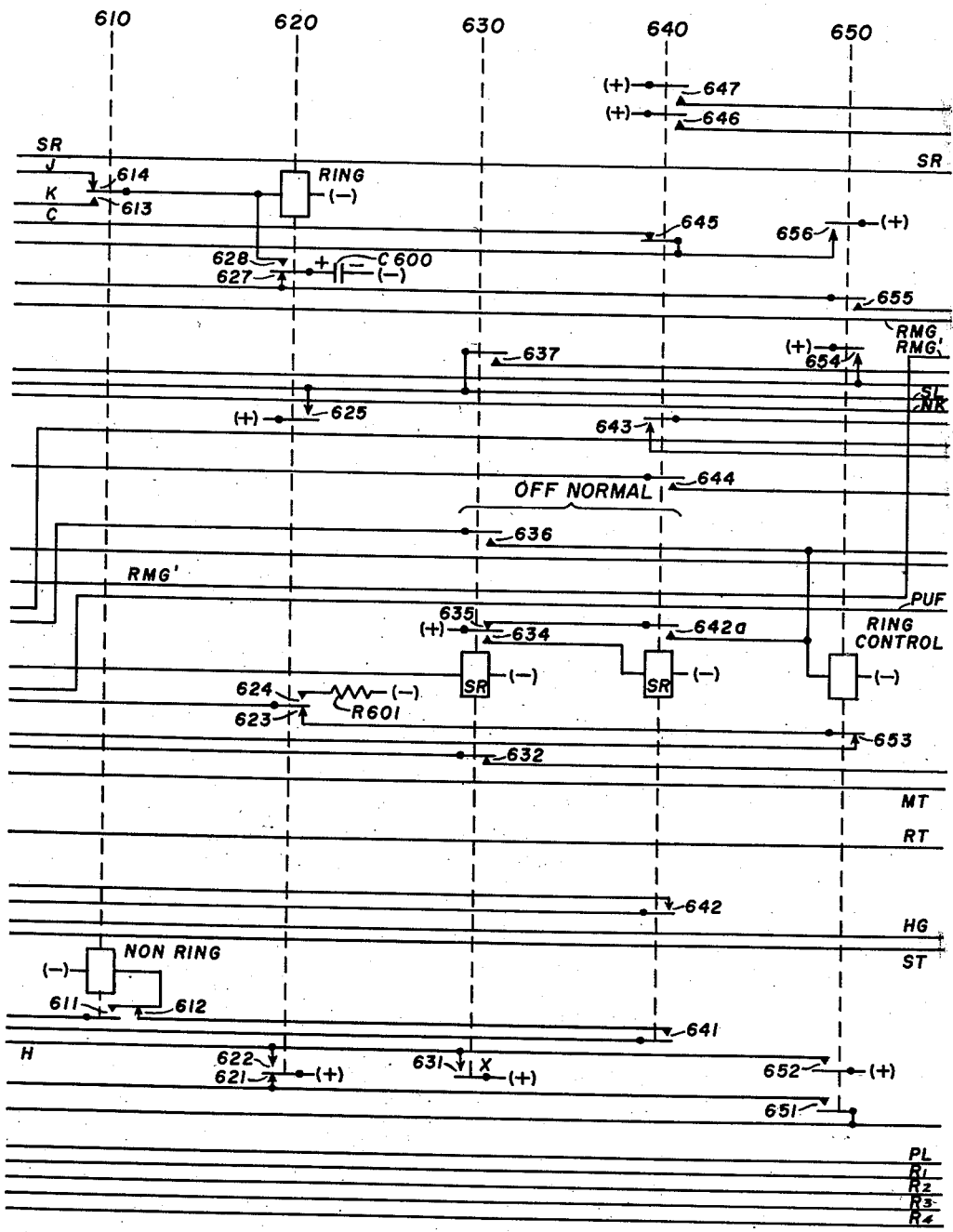
Figure 7:
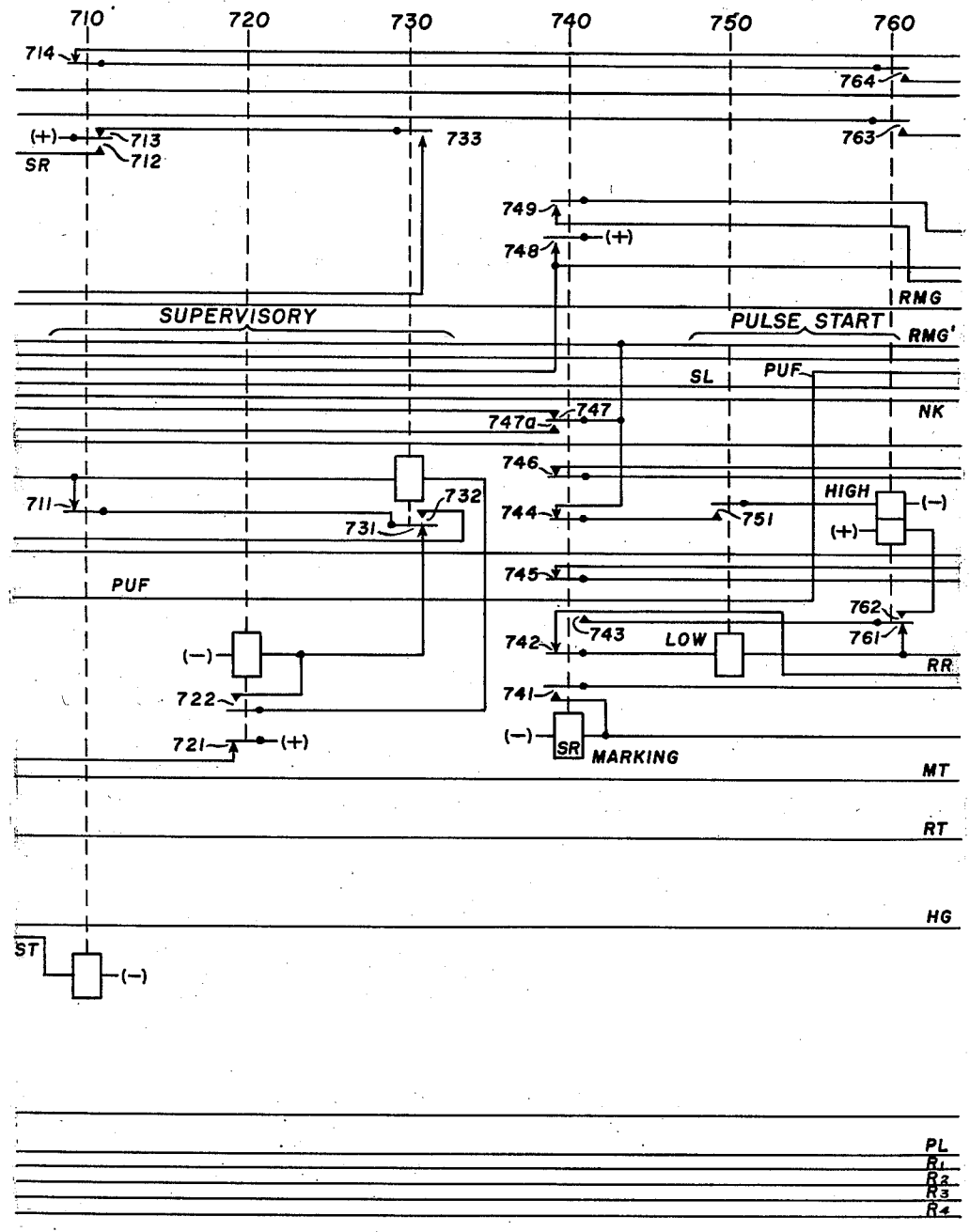
Figure 8:
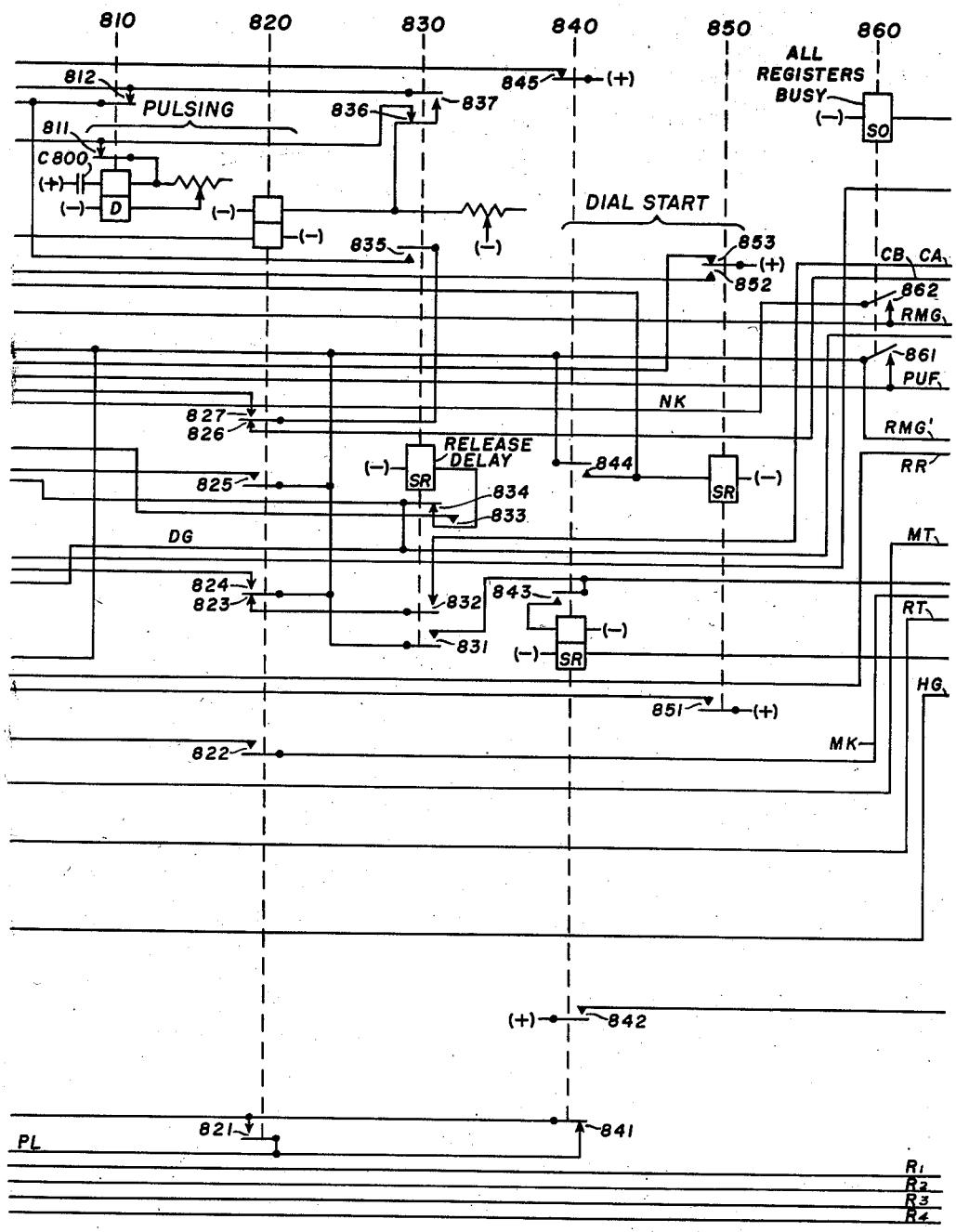
Figure 9:
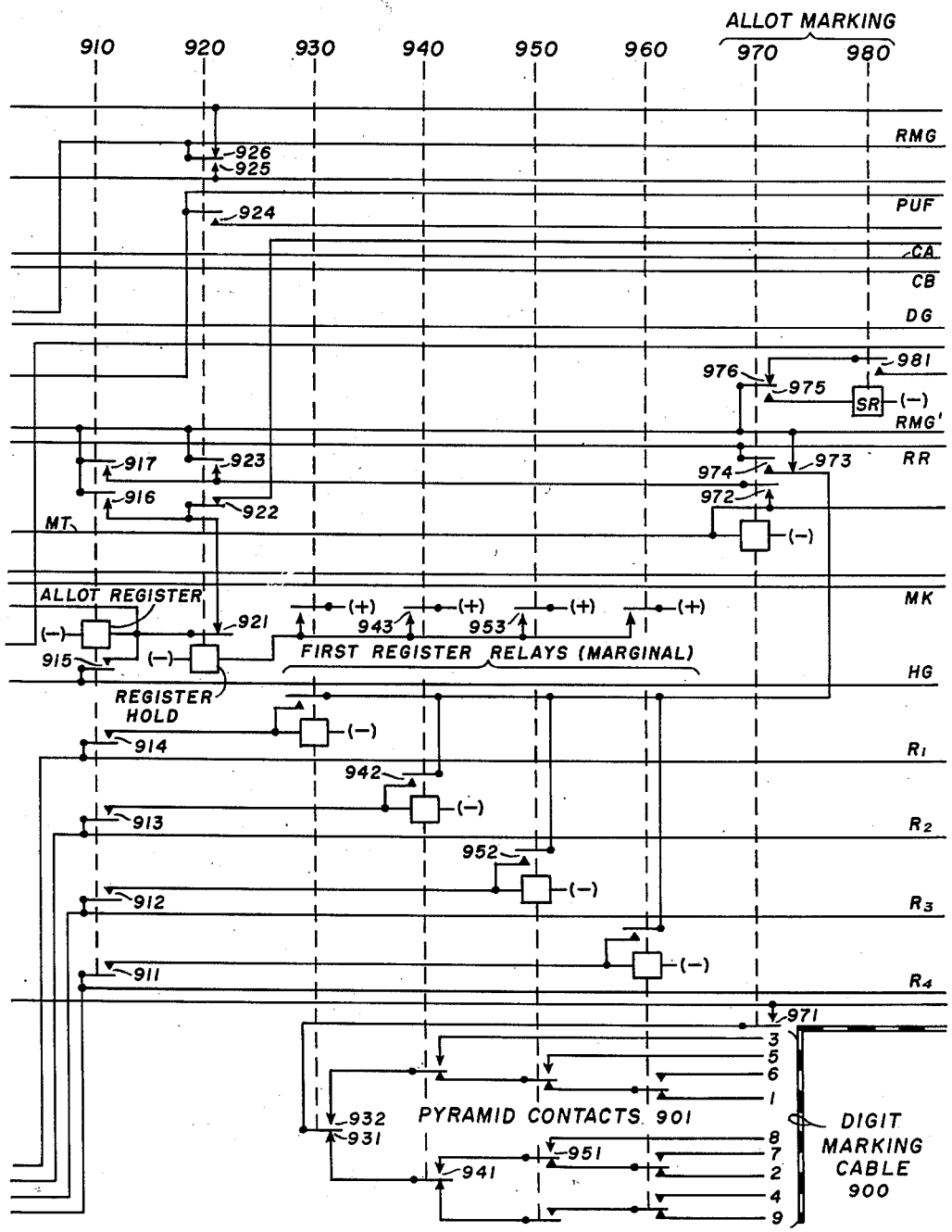
Figs. 9 and 10 show two register circuits such as may be tested with applicant's device.
Figure 10:
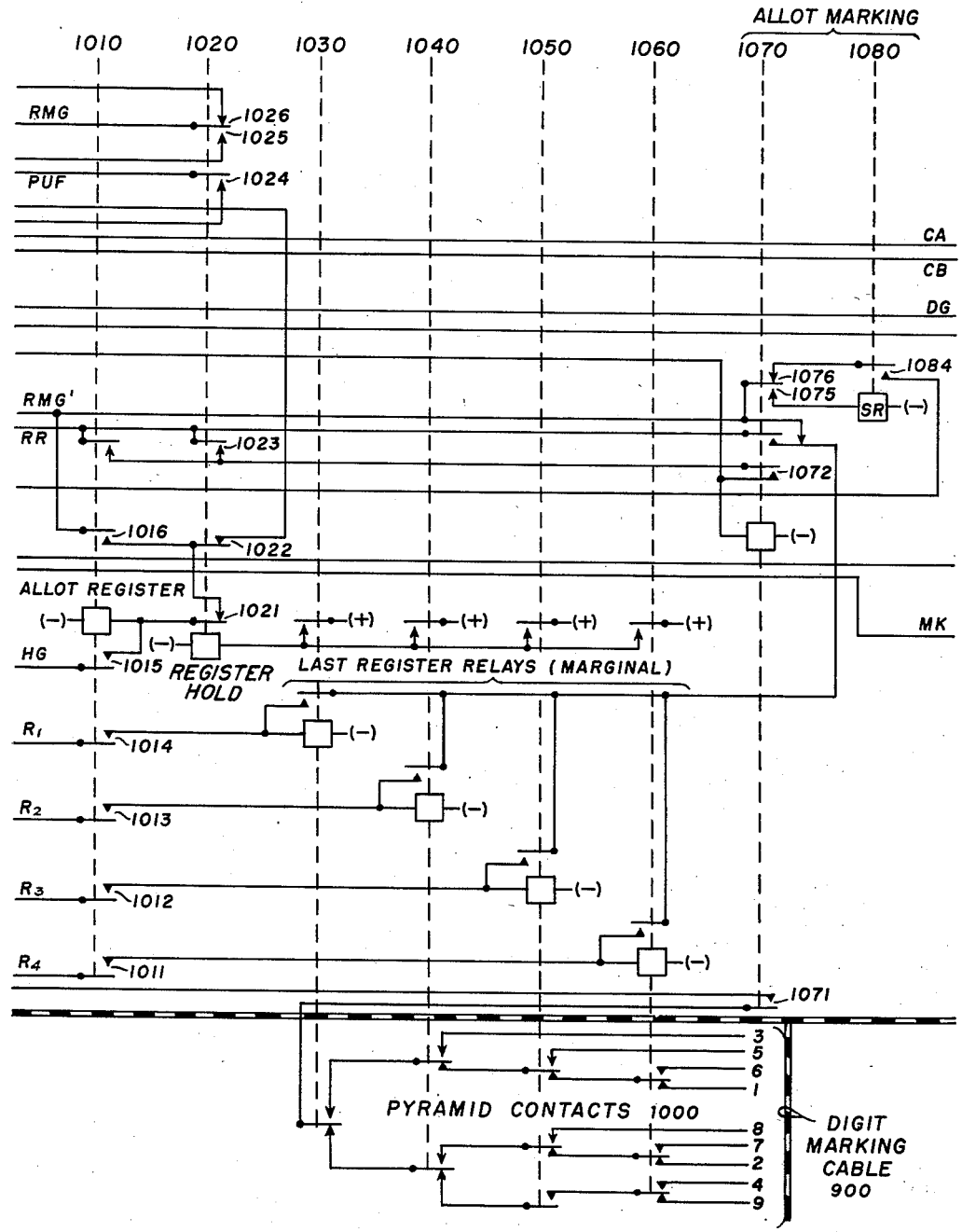

Figs. 2, 3 and 4, when joined together, teach the operation of testing equipment 40. More specifically, digit keys 200 correspond with digit key set 42 while control keys 201 correspond with control key set 41. Control circuit 43 is shown in detail in Fig. 2. The control keys comprise a talk key which applies a ground marking over contacts 205 for the operation of digit keys 200. An error key provides a means for cancelling at contacts 209 incorrectly registered digits. Position key 202 provides a means by which the maintenance man seizes and operates equipment under test. The ring key is a device by means of which the application or cancellation of automatic ringing may be controlled. The SR key is a sender release key which may be pressed after the registration of all digits as an indication that a particular number has been registered completely. In some cases the SR key may control the transfer of a register-sender so that the operator may have access to either of two register-senders thus providing an idle register-sender at all times. Control keys 201 operate the testing device in Figs. 3 and 4 which correspond with testing device 44. After each test is completed, the maintenance man receives an indication by any suitable means which is shown in Fig. 1 by the block 45 and which is shown in Fig. 3 as lamp bank 340 and in Fig. 4 as lamp bank 462. Patching cord 35a corresponds to patching cord 400 which connects the test equipment of Figs. 2, 3 and 4 with the sender of Figs. 5-8. Jack terminals 505 correspond with connection 32. The sender of Figs. 5-8 is that shown schematically as element 36 in Fig. 1, while the registers of Figs. 9 and 10 are represented by the hollow rectangle 38. Counting chain 35 is shown in detail in Figs. 11 and 12.

Briefly, the maintenance man substitutes patching cord 35a for patching cord 34 at connection 32 to provide the circuit arrangement shown in Figs. 2–12. After this he operates various keys according to the test which he is about to make. He then operates various selected digit keys 200 causing the control relays of Fig. 2 selectively to mark register conductors R1, R2, R3 and R4 which extend to a register, such as that shown in Fig. 9, for example, where the digit indication is stored. This stored indication results in a particular coded operation of pyramid contacts 901 which functions to transmit a marking over cable 900 to the counting chain of Figs. 11 and 12. A pulse source, relays 810 and 820, step the counting chain in search of the marked conductor and simultaneously therewith transmit an outgoing impulse over contacts 821 to the testing device in Figs. 3 and 4. A minor switch is stepped by magnet 450 on receipt of each impulse transmitted from contacts 821, thus leaving brush 461 on a terminal indicative of the number of pulses which have been received. This terminal is selectively indicated by one of the lamps in bank 462 which flashes at the end of the test. A proper operation is also indicated by the selective lighting of various lamps in bank 340. Following this, the maintenance man may perform other tests. For example, he may test for stop dial supervision by the operation of one of the keys 330 or 331. A second operation of one of these keys, during any one sending, releases all equipment since it represents a call which has encountered an unstandard condition, such as all equipment busy or a busy called line. The error key in control keys group 201 operates error relay 570 which breaks the register master ground connection at contacts 577 thereby releasing all stored indications. The ring key operates non-ring relay 610 which closes contacts 613 thereby either cancelling automatic ringing or initiating automatic ringing, depending upon the position of the RK key and hence contacts 337 and 338. The sender release key SR operates finish register relay 560 which serves to indicate the last registration in a called number. Until this relay releases, any further operation of digit keys 200 is ineffective thus preventing the mutilation of any called number. (If a register-sender transfer feature were provided, the operation of finished register relay 560 would switch the control circuit to the second register-sender after which any further operation of digit keys 200 would result in registering another called number in a circuit which is the duplicate of Figs. 5–12.)

Since patching cord 35a has negligible resistance with respect to that of the office cabling including items 34, 31, 22 and 21, means must be provided for simulating the intra-office cabling in the test device. For this purpose, I provide a resistance R200 connected to contact 211. This resistance may be either an average selected to match most office conditions, or it might be made adjustable where a wide variation is encountered in actual practice.

It is thought that a clear understanding of applicant's invention will be facilitated by a detailed description of the step-by-step operations required in each test.

Register-sender seized

After completing a connection between the test equipment and the register-sender under test, the maintenance man will seize that register-sender in much the same manner as an operator would. For this purpose, he operates position key 202 thereby extending a grounded (+) over an obvious circuit including contacts 203, taking ground conductor TG and master ground conductor MG in Fig. 4, and through the windings of ground relay 510 to (—) battery. Relay 510 operates to apply master ground to the register-sender circuit by way of contacts 512, register master ground conductor RMG and also by way of contacts 512 and 577 to another register master ground conductor RMG'. Practically all equipment in the register-sender circuits operate from one of these master ground leads; therefore, among other things, position key 202 provides the maintenance man with a simple method of returning everything to normal. Contacts 203 on position key 202 also closes an obvious circuit to slow-operate position take relay 320 which is arranged so that it does not open its contacts until the expiration of a brief interval of time after contacts 203 close. During this brief interval of time position key 202 completes a circuit to seize the register-sender by operating allot register relay 910 over a circuit which may be traced from grounded (+) on contacts 203, through normal contacts 321 of the not yet operated position take relay, over register take conductor RT, and through the winding of allot register relay 910 to (—) battery. Allot register relay 910 operates and locks over a circuit which may be traced from (—) battery through the winding of allot register relay 910, normal contacts 921, operated contacts 916, to register master ground conductor RMG' by way of normal contacts 577 and operated contacts 512. Grounded (+) on close contacts 203 also is extended over normal contacts 322 of the not yet operated position take relay and marker take conductor MT to (—) battery by way of allot marking relay 970 in the first register. Allot marking relay 970 operates and locks by way of its contacts 972 and operated contacts 917 of allot register relay 910 to register master ground 500 as traced above. After an interval of time sufficient to permit relays 910 and 970 to operate and lock, position take relay 320 operates to open contacts 321 and 322.

If the testing is to have any value whatsoever, it is necessary to notify the maintenance man step-by-step of each operation throughout the entire testing procedure from start to finish. For this purpose, means is provided for signaling each operation. In the embodiment of my invention shown in the drawings, means is in the form of lamp bank 340; obviously, however, other signal means could be substituted therefor. Since one operation has been completed, i. e., equipment has been seized, it is necessary to notify the maintenance man of this fact. More specifically, position key 202 closes a circuit for lighting non-key lamp 348 and operating lamp relay 210 as an indication that no digit key is to be operated at this time. The operating circuit may be traced from (—) battery through the filament of non-key lamp 348, closed contacts 204, the winding of lamp relay 210, and over non-key conductor NK to closed contacts 862 of all register busy relay 860. Relay 860 is slow-to-operate and therefore contacts 862 are closed at this time. The circuit may be further traced to grounded (+) 500 by way of register master ground conductor RMG and contacts 512 of ground relay 510. Lamp relay 210 operates to remove ground from the various register leads at contacts 211. This is to prevent a false registration in case the operator should attempt to actuate one of the digit keys before subsequent equipment is ready to receive a registration. That is, lamp relay 210 opens contacts 211 thereby removing a grounded (+) from contacts 221, 231, 241 and 251. If the operator actuates any digit key, at least one of the control relays, 220 for example, operates to attract armature 221 which, however, is ineffective since contacts 211 are open. The resistance R200 simulates the resistance encountered in intra-office cabling.

When position key 202 is operated, transfer lamp 346 lights over a circuit which may be traced from grounded (+) at contact 203, conductor TG, through rest contacts 567, conductor TL and through lamp 346 to (—) battery. This lamp serves no useful purpose at this time.

After a brief interval of time the register-sender is ready to receive and store information indicative of a particular digit. The maintenance man is notified of this fact by non-key lamp 348 which goes out. This brief interval is measured by the slow-operate time interval of all register busy relay 860; therefore, relay 860 now operates over a circuit including contacts 926 and in parallel therewith, contacts 1026, to grounded (+) 500 by way of register master ground conductor RMG and closed contacts 512. Responsive thereto, contacts 862 open thereby removing grounded (+) from the NK lead thus releasing lamp relay 210 and extinguishing non-key lamp 348. Lamp relay 210 closes contacts 211 thereby extending grounded (+) to contacts of control relays 220—250.

*Register-sender test*

The maintenance man sees lamp 348 go out and recognizes this as a signal that he may proceed to actuate the digit keys, if he so desires. Prior thereto, he will selectively operate various keys depending upon which test he desires to conduct. Assuming that the first test is merely to test the general operation of the register-sender, the maintenance man proceeds by operating the talk key of control key group 201 to close contacts 205 thereby extending a grounded (+) marking to each of the digit keys. Trunk key 332 must also be operated to complete a circuit for loop lamp 345 by way of contacts 334 as an indication that the circuit simulates a completed connection to the trunk circuit. In this case the simulated trunk comprises pulsing conductor PL which represents the usual ring conductor and by off-normal conductor ON which represents the usual tip conductor. Pulsing contacts 821, found in Fig. 8, provides a connection to grounded (+) on contacts 621 by means of which ground pulses may be transmitted over conductor PL into the test device. Contacts 336 of trunk key 332 prepare a circuit for pulsing relay 410 which is not immediately effective while contacts 335 prepare a circuit for off-normal relay 360 which is not operated at this time since its circuit is now open at contacts 312.

The circuit is now in condition for transmitting directive control pulses; therefore, the maintenance man may proceed by actuating any desired one of the digit keys responsive to which either one or two of the control relays 220, 230, 240, and 250 operates to close its or their lowermost contacts thereby selectively marking the register conductors R1, R2, R3 or R4. The purpose of markings on these R conductors is to control register relays in either Fig. 9 or Fig. 10 thereby completing a path for the registration of a condition indicative of which key was operated.

For the sake of explanation, it may be assumed that the key first operated is digit key 8. Upon inspection of this key it will be seen that contacts 206 close a circuit for the operation of control relay 240 over a path which may be traced from grounded (+) through closed contacts 205, 208 and 206 through the winding of relay 240 to (—) battery. Contacts 207 close a circuit from grounded (+) at contacts 205 which may be traced through the winding of control relay 230 to (—) battery. Each of these control relays operates to close its lowermost contacts 231 and 241 thereby extending a marking grounded (+) applied at armature 211 to the conductors R2 and R3. Control relays 230 and 240 also operate contacts 232 and 242 thereby closing a circuit extending from grounded (+) at contacts 203, through operated contacts 232 and 242 in parallel, to the hold ground conductor HG which serves to extend a temporary holding ground for the particular register in which the digit is to be stored. At contacts 233 and 243, control relays 230 and 240 open the loop connecting conductors PUR and PUF, thereby removing grounded (+) 500 which was formerly extended over operated contacts 512, rest contacts 577 and conductor PUR to conductor PUF.

It is necessary to store an indication of the keyed digit "8" so that other digits may be keyed without having to wait for the transmission of a complete train of digit pulses. First, the register of Fig. 9 is assigned. Then, various register relays operate depending upon the digit key that was pressed after which that register locks under the influence of a register hold relay until the sender completes the transmission of the digit pulse train representing the stored digit. Responsive to the completion of such transmission, the register is unlocked and marked idle for further storing digits. Meanwhile, succeeding digits are stored in other registers as fast as they are keyed. More specifically, the grounded (+) applied by way of closed contacts 203, 232 and 242 to the HG lead serves to lock allot register relay 910 operated by way of contacts 915 (it previously operated before slow-operate relay 320 opened contacts 321), thereby closing contacts 911—914 to connect the first register relays 930, 940, 950 and 960 to register conductors R1, R2, R3 and R4, respectively. Thus, relays 940 and 950 are operated over conductors R2 and R3 from contacts 231 and 241 of the control relays. Contacts 943 and 953 close to operate register hold relay 920, which operates to open contacts 921 thereby breaking one of the holding paths for allot register relay 910.

After a brief interval of time, the maintenance man releases digit key 8 thereby opening contacts 206 and 207, thus releasing control relays 230 and 240, opening contacts 232 and 242, to remove grounded (+) on closed contacts 203 from holding conductor HG. Allot register relay 910 releases.

The first register relays do not release because contacts 942 and 952 complete a holding circuit which may be traced from (−) battery through the windings of relays 940 and 950, respectively, and contacts 974 to grounded (+) by way of conductor RR, contacts 742, the low resistance winding of relay 750 to register master ground conductor RMG'. Relay 750 operates, closing contacts 751 for operating high resistance relay 760, about which more will be said later in the section headed "Register Release."

*Assignment of next register*

The first digit is completely registered at this time and therefore it is necessary to assign the next register (that of Fig. 10). For this purpose, register hold relay 920 (operated responsive to the closing of contacts 943 and 953) closes contacts 924 thereby completing a circuit for the operation of allot register relay 1010 as an indication that register relays 1030, 1040, 1050 and 1060 are next to be used. This circuit may be traced from (−) battery through the winding of allot register relay 1010, rest contacts 1021 and 1022, operated contacts 924 to conductor PUF which extends to Fig. 2 where contacts 233 and 243 have just closed responsive to the release of digit key "8," thereby connecting conductors PUF and PUR which further extends the connection by way of closed contacts 577 and 512 to grounded (+) 500. Allot register relay 1010 operates thereby closing contacts 1011, 1012, 1013 and 1014, thus assigning register relays 1030, 1040, 1050 and 1060. Relay 920 also opens contacts 926 and closes contacts 925 thereby removing one connection to all register busy relay 860 which previously extended through contacts 926 and register master ground conductor RMG to grounded (+) 500 by way of closed contacts 512; however, all register busy relay 860 does not release at this time since another holding circuit is completed by way of closed contacts 1026 (the register of Fig. 10 being then idle).

*Sending the stored digit*

Since the digit indication is completely stored, the register of Fig. 9 now is in condition to control the transmission of a train of impulses representative of the stored markings. However, before the actual pulse train is transmitted it is necessary to prepare the sender.

More in detail, an off-normal condition is created to signal the sender when register hold relay 920 closes contacts 925 for extending register master ground conductor RMG and therefore grounded (+) 500, connected through operated contacts 512, to the winding of main start relay 530 and (−) battery. Relay 530 operates thereby closing contacts 531, thus extending grounded (+) over conductor PU to pickup lamp 342 and dialing relay 310 to (−) battery. Dialing relay 310 operates to simulate the operation of a dialing relay in an operator cord circuit. The dialing relay of a cord circuit normally associates that particular cord circuit which is individual to a call with the dial circuit which is common to many cord circuits, thus preparing a signal path which extends from the register-sender to the particular cord circuit over which the call is to be extended. Pickup lamp 342 lights as an indication that the circuit has in fact been so extended. In operating, dialing relay 310 connects grounded (+) through closed contacts 311, 330 and 331 to the ST lead and supervisory relay 710. At contacts 312, dialing relay 310 completes a circuit closing conductor ON for operating off-normal relays 360 and 520, the circuit being traced from grounded (+) through the winding of relay 360, operated contacts 335 and 312, the ON conductor, through resting contacts 623, 653 and operated contacts 511 to (−) battery through the winding of off-normal relay 520. Supervisory relay 710 closes its contacts 712 thereby extending grounded (+) over the SR conductor to light supervisory lamp 349 as an indication of the extent to which the sending operation has developed this far. Relay 360 operates and prepares a circuit for pulsing relay 410 and for a second off-normal relay 370. The off-normal relay 520 also operates in series with relay 360 thereby closing contacts 521 to complete an obvious circuit for the operation of still another off-normal relay 630.

Since dialing relay 310 picked up as simulated from a cord circuit, it now is necessary to hold that relay from the register-sender to maintain connection between the register-sender and the cord circuit. For this purpose relay 630 closes contacts 631 to extend a grounded (+) over the H conductor and through the filament of hold lamp 341 to dialing relay 310. Lamp 341 lights as an indication that the register-sender will in fact hold the dial circuit. Relay 630 also breaks the pickup conductor at contacts 632 extinguishing lamp 342; however, there is no danger of dialing relay 310 releasing at this time since contacts 631 are "X" contacts which close before contacts 632 open. Relay 630 also closes contacts 637 completing a circuit for lighting sending lamp 347 as an indication that the register-sender is now ready to send outgoing pulses. The circuit for lamp 347 may be traced from (−) battery through the filament of sending lamp over the SL lead, through contacts 637 to grounded (+) on contacts 853.

Before the individual outgoing impulses may be sent, it is necessary to start pulsing relays 810 and 820 which serve to step a counting chain and simultaneously therewith to transmit outgoing pulses. That is on each step of the counting chain, a test is made to determine whether that step completes the digit pulse train, if not a further step is taken and another outgoing impulse is transmitted. This process is repeated until the entire pulse train is completed.

In detail, the pulse source is started by the energization of relay 810. It will be recalled that allot marking relay 970 operated from grounded (+) on contact 203 for the brief interval required for the slow-operate position take relay 320 to open contacts 322, after which allot marking relay 970 locked to register master ground conductor RMG' by way of contacts 972 and 917. Relay 970 also closed contacts 974 thereby completing a circuit to operate pulse start relay 750 over the path including closed contacts 974, conductor RR, contacts 742, the winding of low resistance relay 750, a register master ground conductor RMG', closed contacts 577 and 512 to grounded (+) 500. Pulse start relay 750 operates to close its contacts 751 thereby operating the high resistance pulse start relay 760 which in turn closes its contacts 763 thereby completing a path to pulse source relay 810 over the circuit which may be traced from (−) battery through the lower winding of relay 810, a potentiometer, and contacts 811, 763, and 646 to grounded (+). Pulsing relay 820 also operates over the circuit including contacts 646, 763 and 836. It will be noted that a grounded (+) is now applied to each side of capacitor C800 causing it to discharge; it previously had been charged over the upper winding of relay 810, a potentiometer and the lowermost winding of relay 810. For a brief interval of time, capacitor C800 is discharging. This discharging current differentially energizes relay 810, preventing its operation. When a sufficient charge has leaked off capacitor C800, according to the setting of the potentiometer, current in an energizing circuit including the lower winding of relay 810, contacts 811, 763 and 646 is sufficient to operate relay 810 which attracts armature 811, thereby breaking its own energizing circuit. Capacitor C800 is now charging over a circuit from (—) battery through the lower winding of relay 810, the potentiometer, the upper winding of relay 810, capacitor C800, to grounded (+). For a brief interval of time, this charging current is sufficient to hold relay 810 after which time the charge on capacitor C800 is built to a sufficient level, and the charging current ends (contacts 811 being then open) causing relay 810 to release. This process is repeated continuously as long as contacts 763 remain closed. On each operation and release, pulse generating relay 810 opens and closes contacts 812 thereby pulsing relay 820 over a path which may be traced from (—) battery, through the winding of relay 820 and contacts 837, 812 and 647 to grounded (+)—contacts 714 are open at this time. Each time that relay 820 is pulsed under the influence of contact 812, various contacts are opened or closed to control the operation of the counting chain in Figs. 11 and 12 or to transmitting an outgoing impulse at contact 821.

Once pulsing relays 810 and 820 are running, the counting chain (Figs. 11 and 12) is stepped simultaneously with the transmission of outgoing pulses to count to the number which was keyed. The first closure of contacts 825 by pulsing relay 820 completes a circuit for the operation of release delay relay 830 over a path which may be traced from (—) battery through the winding of relay 830, closed contacts 834, 746 and 825 to register master ground lead RMG', contacts 577 and 512 to grounded (+) 500. Release delay relay 830 operates and locks over the path from (—) battery through the winding of relay 830, closed contacts 833, 643 and 747 to register master ground conductor RMG'. On operation, release delay relay 830 closes its contacts 831 thereby extending grounded (+) on register master ground conductor RMG' to contacts 1263, 1253, 1243, 1233, 1213, 1173, 1163, 1153, 1143, 1132 and 1123 through the winding of pickup chain relay 1110 to (—) battery. This relay operates and attracts its armature 1114, locking to the CB conductor and contacts 826 which close when relay 820 next releases responsive to the operation of relay 810.

Once relay 1110 operates, relays of the pickup chain and the counting chain are sequentially operated in a step-by-step fashion in search of a marked conductor in cable 900. That is, pickup chain relay 1110 operates contacts 1116 thereby connecting the CA conductor to the second pickup chain relay 1120. The next time that pulsing relay 820 releases, it completes a circuit from register master ground conductor RMG' through closed contacts 823 and 832 to the CA conductor, and closed contacts 1116 to (—) battery through the winding of relay 1120. This relay opens contacts 1123 thereby breaking the original operating circuit for the first pickup chain relay 1110 which continues to hold over contacts 1114 and the CB conductor to contacts 826, 835 and 647 to grounded (+). When relay 820 next operates to remove grounded (+) at contacts 826, relay 1110 releases to close contacts 1117. It will be noted that contacts 1126 are now closed since relay 1120 holds by way of contacts 1122, 1132, 1143, 1153, 1163, 1173, 1213, 1223, 1233, 1243, 1253, 1263 and 831 and register master ground lead RMG' to grounded (+) 500 by way of contacts 577 and 512. In a similar manner, each of the relays in the pickup chain and the counting chain controls the release of the next preceding relay and prepares the next succeeding relay which will operate on the next release of pulsing relay 820.

When relay 1130 operates at the end of the pickup chain, contacts 1133 close as an indication that the next relay to operate in the counting chain represents the digit 1. The net result is that dial start relay 840 operates over the path from (—) battery through the lower windings of relay 840, contacts 1133, 745 and 824 to register master ground conductor RMG'. Relay 840 locks over contacts 843 and 831 to register master ground conductor RMG'. Contacts 841 open to put the PL conductor under the control of pulsing relay 820 at contacts 821. Contacts 842 close to extend a grounded (+) marking to pyramid contacts 901 by way of contacts 971, while contacts 844 operate a second dial start relay 850.

Relay 820 continues pulsing to transmit the proper number of outgoing digit pulses, opening contacts 821 on each impulse. Pulsing relay 410 operates over contacts 365, 336 and pulsing conductor PL through contacts 821, 571 and 621 to grounded (+). Pulsing relay 410 closes contacts 412 thereby operating off-normal relay 370 over the circuit including grounded (+), the winding of relay 370, contacts 412, 363, 335, 312 and the off-normal conductor ON to (—) battery by way of contacts 623, 653, 511 and the winding of off-normal relay 520. Relay 370 operates and locks at its contacts 372 to the off-normal conductor ON over the operating path just described. Responsive thereto contacts 371 open; however the loop lamp does not go out since another circuit for lighting loop lamp 345 is completed over the path which may be traced through contact 334 to grounded (+) on closed contacts 411; thus, lamp 345 flashes on each pulse. This is an indication that the outgoing pulses from contacts 821 are actually being transmitted into the trunk. Otherwise, it may be possible for everything to be functioning perfectly and yet contacts (821, for example) may be dirty, or for some other reason, the outgoing pulses never reach the trunk. Pulsing relay 410 closes contacts 413 which are part of a path for operating stepping switch magnet 450. Operation of contacts 414 completes a circuit from grounded (+) through closed contacts 366 and 414 to operate release delay relay 420 which in turn closes its contacts 421. These are not effective at this time; however they prepare a circuit for shunt relay 430. A brief time interval later pulsing relay 410 releases responsive to the release of pulsing relay 820 opening its contacts 821 and thus transmitting the first outgoing pulse. Relay 410 opens contacts 414 and closes contacts 415. A circuit is now closed to operate shunt relay 430 via contacts 366, 415 and 421. Shunt relay 430 closes contacts 432 to operate a second shunt relay 440 and also closes contacts 433 to prepare a path for operating stepping magnet 450; however, magnet 450 does not operate at this time since contacts 413 are now open. Shortly thereafter pulsing relay 820 reoperates to close contacts 821 thereby reoperating pulsing relay 410 which closes contacts 413 to operate stepping magnet 450 once, thus moving brush 461 once as an indication that one pulse has been received. Relays 420, 430 and 440 hold operated throughout pulsing due to their slow release characteristics. The process repeats on each pulse from relay 820—leaving brush 461 standing on a contact which is representative of the number of pulses in the outgoing pulse train just transmitted.

Returning for the moment to the register of Fig. 9, it controls the sender circuit to determine the number of outgoing impulses. Briefly, one digit marking conductor is at grounded (+) potential and this marking is extended over cable 900 to the counting chain. When the marking is reached, pulsing relays 810 and 820 are disabled to end the outgoing digit pulse train. More specifically, allot marking relay 970 is operated at this time thereby closing contacts 971 as an indication that the marking stored in the first register (Fig. 9) is the first to be operative for controlling the counting chain, Figs. 11 and 12. Since it was assumed that the digit 8 was registered, relays 950 and 940 are locked operated; therefore, it is possible to trace the circuit from grounded (+) on contact 842 through contacts 971, 931, 941 and 951 to conductor 8 of the digit marking cable 900. This marking is extended over cable 900 to Fig. 12 where conductor 8 is at grounded (+) potential.

Figure 11:
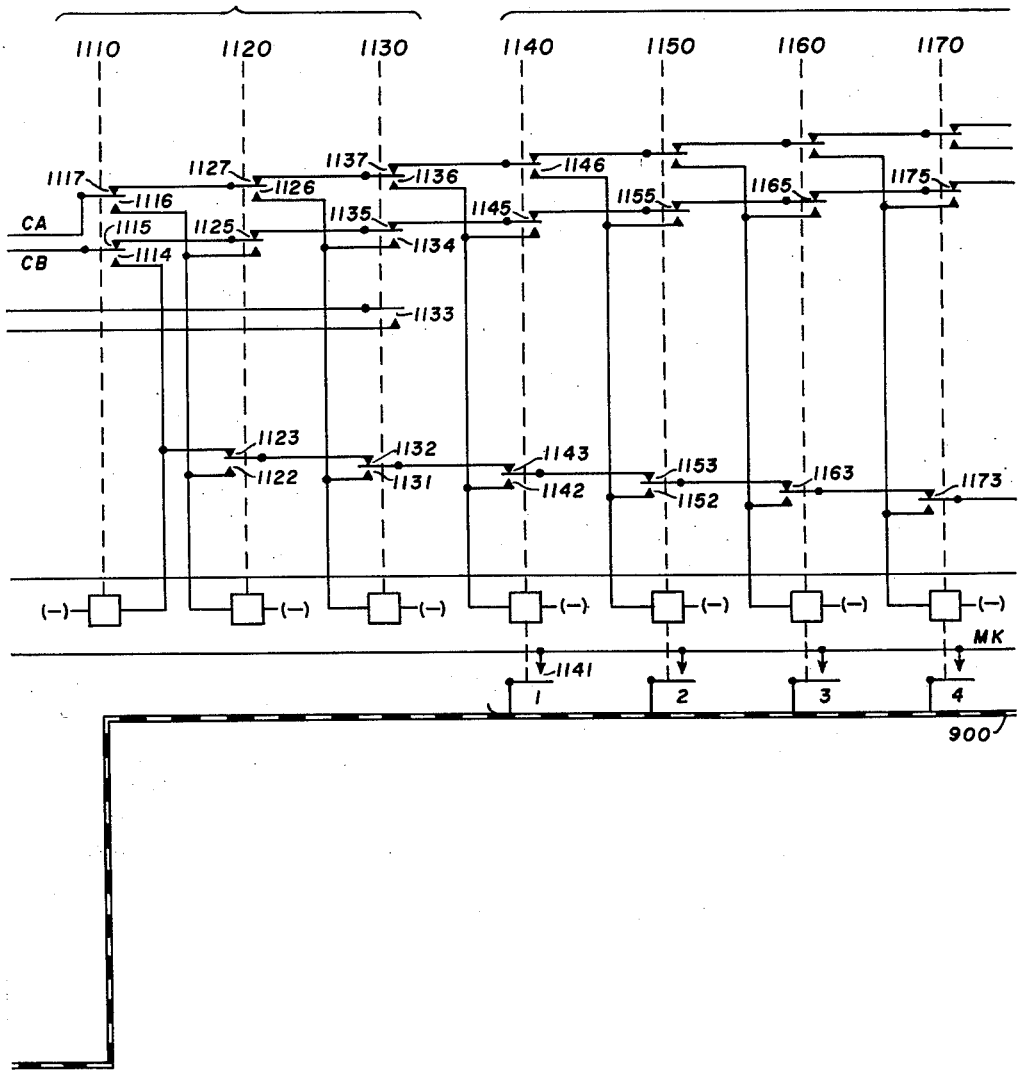
Figures 12, 13:
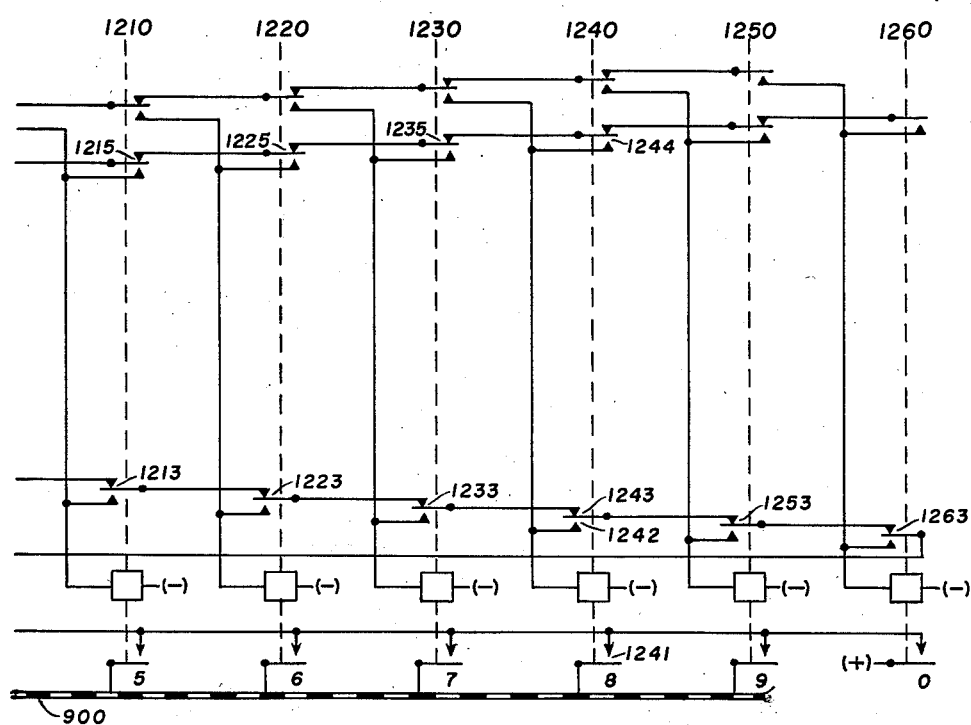

In the counting chain of Figs. 11 and 12 each relay controls the release of the preceding relay and prepares a circuit for operating the next relay. Following the operation of relay 1130, the resulting closure of contacts 1133 is an indication that the next pulse is the first outgoing impulse in the train of digit pulse, relay 1140 operates responsive to the next release of pulse relay 820. That is, contacts 823 close to complete a circuit which may be traced as follows: from (—) battery through the winding of relay 1140, closed contacts 1136, 1127, 1117, conductor CA, contacts 832 and 823, to the register master ground conductor RMG' and through contacts 577 and 512 to grounded (+) 500. Relay 1140 operates to open contacts 1143 over which relay 1130 has been holding. Relay 1130 continues to hold over contacts 1134 and conductor CB until the next operation of pulsing relay 820 opens contacts 826 to release relay 1130 thereby opening contacts 1136 and closing contacts 1137. Meanwhile, relay 1140 holds over a circuit which may be traced from (—) battery through the winding of relay 1140, contacts 1142, 1153, 1163, 1173, 1213, 1223, 1233, 1243, 1253, 1263 and 831 to register master ground conductor RMG'. Nothing further happens at this time since there is no marking on digit marking conductor 1 of cable 900. An attempt to trace this conductor through pyramid contacts 901 reaches open contacts 932. A short time later, relay 820 releases closing contacts 823 and 826 thereby stepping the counting chain one step further. That is, a circuit is now closed for relay 1150 over a path which may be traced from (—) battery through the winding of relay 1150, closed contacts 1146, 1137, 1127, 1117 and over conductor CA through closed contacts 832 and 823 to register master ground conductor RMG' and contacts 577 and 512 and grounded (—) 500. Relay 1150 operates to open contacts 1153 thereby releasing one holding circuit for relay 1140, and relay 1150 locks to register master ground conductor RMG' by way of contacts 1152, 1163, etc., 831 and 823.

The counting chain continues this step-by-step operation. As it operates, each relay in the counting chain completes a circuit to the marking conductor MK. In the case of each of the conductors 1—7 nothing happens since the circuit from marking relay 740 may be traced back to pyramid contacts 901 where an open condition is found. It may also be recalled that pulsing relay 820 transmits an outgoing pulse at contacts 821 corresponding to each of the digit marking conductors 1—7.

This process continues, the counting chain being stepped one step for each operation of pulsing relay 820 until digit marking conductor 8 is reached, at which time a circuit is completed for the operation of marking relay 740 to indicate the end of outgoing impulses transmitted at contacts 821, eight impulses having been transmitted. This circuit may be traced from (—) battery through the winding of marking relay 740 and contacts 822, over marking conductor MK to contacts 1241, digit marking conductor 8, cable 900, pyramid contacts 901, closed contacts 951, 941, 931, 971 and 842 to grounded (+). Marking relay 740 operates to close contacts 741 and lock to a grounded (+) extended from contacts 851. At contacts 742, the marking relay opens the register hold circuit through low resistance relay 750 which releases, and at contacts 743, closes the register hold circuit through contacts 762 to grounded (+) by way of the lower winding of high resistance relay 760. Contacts 743 may be arranged to close before either of the contacts 744 or 742 open.

*Release of register*

The sending function being now complete, the register of Fig. 9 must be released while the sender is held immobile to prevent the transmission of any false impulses. It will be recalled that register relays 940 and 950 had previously locked to conductor RR by way of contacts 942 or 952 in series with contacts 974. The register relays are marginal and will hold in series with the low resistance of relay 750 which is normally connected to conductor RR but will release when held in series with high resistance relay 760. Therefore, register relays 940 and 950 release responsive to the shifting of register hold conductor RR from low resistance relay 750 to high resistance relay 760 by means of contacts 742 and 743, thereby opening the circuit at contacts 942 and 952 over which high resistance relay 760 was held, this circuit being traced over contacts 762, 743, 974, 942 and 952 in parallel, to (—) battery through the windings of relays 940 and 950. High resistance relay 760 releases. In releasing, relays 940 and 950 open contacts 943 and 953 causing register hold relay 920 to drop. When relay 760 releases, contacts 763 and 764 open to disable pulsing relays 810 and 820. During this interval, relay 820 has been held operated by marking relay 740 to insure the fact that no further impulses will be transmitted, the holding path being (—) battery, the winding of pulsing relay 820, contacts 749 and 844 to grounded (+) on register master ground conductor RMG'. Marking relay 740 opens three holding circuits for release delay relay 830 at contacts 746, 747 and 745. Release delay relay 830 drops to open contacts 831 in the holding circuit of dial start relay 840, releasing this relay, thereby opening contacts 844 over which the second dial start relay 850 was held causing it to release.

Pulsing relay 820 falls since all of its holding circuits are now open. That is, contacts 844 open responsive to the release of dial start relay 840, contacts 837 are open due to the release of release delay relay 830, and contacts 763 are open due to the release of high resistance relay 760. Marking relay 740 falls since contacts 822 open responsive to the release of relay 820 and since contacts 851 opened responsive to the release of second dial start relay 850. Main start relay 530 drops responsive to the opening of contacts 747a.

Returning to the operation of the counting chain, it will be recalled that each of the relays operated and locked depending upon the next relay for its unlocking and release. Since relay 1240 operates last in the case supposed—the digit 8—it remains locked over contacts 1242 and 1244; therefore, to return the counting chain to normal, it is necessary to open both of these holding circuits at this time. The circuit from contacts 1242 extend to contacts 1253 and 1263 to contacts 831 which are now open since release delay relay 830 has fallen. The second holding path extending from contacts 1244 is by way of contacts 1235, 1225, 1215, 1175, 1165, 1155, 1145, 1135, 1125, and 1115 to the CB conductor and contacts 826 which are now open. Thus, the counting chain is returned to normal.

*Digit test*

The purpose of stepping brushes 461 in synchronism with pulsing relay 820 is to determine, by test, how many outgoing pulses are actually transmitted and whether all of these pulses are suitable for stepping a switch. At this time, it may be well to review, briefly, the manner in which this test has been set up by the operations just described.

Since it was assumed that the maintenance man operated digit key 8, digit marking conductor 8 was connected to grounded (+) on contact 842, which marking was then extended over cable 900 to digit marking conductor 8 at contacts 1241 of relay 1240 in the counting chain of Fig. 12. The counting chain was operated step-by-step until it reached this marking, at which time a circuit was completed over the marking conductor MK to operate marking relay 740, which closed contacts 749 to hold pulsing relay 820 operated over a circuit including contacts 844, register master ground conductor RMG′, contacts 577 and 512 to grounded (+) 500. This held the pulsing relay 820 operated so that it could not transmit further pulses at contact 821. Thus, pulsing relay 410 received eight pulses responsive to which stepping magnet 450 operated brushes 461 to the eighth position thereby completing a circuit for the eighth lamp in the counting lamp bank 462.

The paragraph above reviews the operation which set up the test conditions. Following this the results of the test are given when a circuit is completed to flash lamp 8 in bank 462 as an indication that eight digit pulses were actually received. More specifically, when relay 820 holds at the end of the pulse train, pulsing relay 410 in turn holds its contacts 415 open and contacts 414 closed, thus completing a circuit for holding release delay relay 420 operated and for releasing shunt relay 430 which drops shortly to open the holding path of a second shunt relay 440 at contacts 432 while closing contact 431 thereby completing a circuit by way of contacts 431 and 441 to common terminal 464 of the minor switch. (Contacts 441 remain closed during the slow release time interval of relay 440.) Since wipers 461 have been stepped to the eighth position, a circuit is completed from contact 464 by way of shorting wiper 461 and lamp 8 to (−) battery 465. After a brief interval of time determined by its slow release characteristics, relay 440 releases closing contacts 442 and opening contacts 441, thereby extinguishing the lamp which was lit. This flash of lamp 8 indicates to the maintenance man the number of digit pulses which were transmitted by pulsing contacts 821 of pulse relay 820. When relay 440 closed its contacts 442, a circuit is completed for operating release magnet 460 to return the minor switch to normal, the circuit being by way of contacts 431, 442 and minor switch off-normal contacts 463. Upon reaching normal, off-normal contacts 463 open to cause release magnet 460 to drop. The maintenance man may now proceed to key further digits, thereby testing the register, counting chain and sender under various conditions.

*All registers busy and supervision test*

The maintenance man may now conduct a test to determine whether proper supervision is returned when all registers are filled. By way of explanation, it may be well to review how the registers are assigned, as was explained above under the heading "Assignment of Next Register." The first digit is stored in the register of Fig. 9, this register being assigned by the operation of register allot relay 910 which attracted armatures 911—914 thereby completing a connection from the first register relays 930, 940, 950 and 960 to conductors R1, R2, R3 and R4. After the first digit is registered, register hold relay 920 operates to close contacts 924 thereby causing allot register relay 1010 to operate over a path which includes contacts 1021, 1022, 924, conductor PUF, contacts 223, 233, 243, and 253, conductor PUR, contacts 577 and 512 to grounded (+) 500. Allot register relay 1010 closes its contacts 1011—1014 thereby connecting the last register relays 1030, 1040, 1050 and 1060 to control conductors R1, R2, R3 and R4, respectively.

The maintenance man operates any digit key which he may desire causing various control relays of Fig. 2 to operate in combination. The subsequent functions are substantially the same as those described above in connection with the register of Fig. 9; however, if the sender has not yet transmitted pulses representative of the digit stored in the register of Fig. 9, then both registers are busy and further keying must be postponed.

Normally, it is contemplated that the first register will be idle before the last register is filled completely. In such a case, register hold relay 1020 closes contacts 1024 thereby operating allot register relay 910 over a path including contacts 921, 922, 1024, conductor PUF, contacts 223, 233, 243, 253, conductor PUR, contacts 577 and 512 to grounded (+) 500, thus reassigning the register of Fig. 9. Meanwhile allot marking relay 970 releases when register hold relay 920 opens contacts 923. It will be recalled that the register hold relay is released responsive to the complete transmission of an outgoing pulse train by the sender circuit. Allot marking relay 970 releases contacts 975 thereby opening the circuit by which a second allot marking relay 980 has been held operated; however, this relay continues to hold briefly during its slow release period. Relay 970 also closes contacts 976 for extending grounded (+) from register master ground conductor RMG′ over contacts 876 and 981 to allot marking relay 1070 which operates and locks over contacts 1072 during the slow release time of relay 980, after which the original operating circuit for relay 1070 is opened at contacts 981. A second allot marking relay 1080 operates when relay 1070 closes contacts 1075. Allot marking relay 1070 then closes contacts 1071 for applying grounded (+) on contact 842 to pyramid contacts 1000. Thus, the counting chain once more will be directed through its chain of operations in search of the digit marking conductor extending the grounded (+) from contacts 842 through pyramid contacts 1000, over cable 900 to register relay contacts such as 1141, for example. After a digit pulse train representing the digit stored in Fig. 10 is completed, register hold relay 1020 releases—in the same manner as did register hold relay 920—thereby opening contacts 1023 to release allot marking relay 1070 which had been holding operated at contact 1072. This reoperates allot marking relay 970 during the slow release interval of relay 1080 by way of contacts 1076 and 1084 in much the same manner as described above when relay 1070 originally operated during the slow-release time of relay 980.

In some cases, the operator may key digits too fast—or for some other reason the registers may not be emptied as anticipated—in which case an all register busy condition is encountered and the operator must be so informed. That is to say, if the operator were permitted to key further digits, these keyings would be ineffective since no register is then available for storing the information. She must be aware of this fact; therefore a lamp lights at her position and the marking path for register conductors R1, R2, R3 and R4 is opened.

It is desirable to provide a maintenance man with means for testing to determine whether the operator would in fact receive a proper all register busy supervision and to determine whether further digit keys would in truth be ineffective. To initiate this test, the maintenance man first must produce an all register busy condition. He may do this by disabling the sender by any desired means. For example, he may operate one of the supervisory keys 330 or 331 thereby releasing relay 710 which in turn closes contacts 714 to complete a circuit via contacts 845, 714, 764 and 837 to hold pulsing relay 820 operated. This prevents the transmission of any outgoing digit pulses until the supervisory key is released to reoperate relay 710. While one of the supervisory keys 330 or 331 is so thrown, the maintenance man proceeds to key enough digits to fill all available registers. Assuming this to be the case, both of the register hold relays 920 and 1020 are operated thereby opening contacts 926 and 1026. Since the multiple holding paths for all registers busy relay 860 are now open, this relay releases to close contacts 861 and 862. It will be recalled that each of the control relays is provided with a contact such as 233 and 243 for disconnecting grounded (+) 500 from conductor PUF—it previously had been extended by way of contacts 512, 577 and conductor PUR. When all registers busy relay 860 closes contacts 861, grounded (+) 500 is connected directly to conductor PUF over a circuit including register master ground conductor RMG′, contacts 577 and 512. After the all registers busy condition has ceased, for example the register of Fig. 9 becomes idle, it is necessary to cause that register to be assigned as the next to receive and store a digit. For this purpose grounded (+) 500 is connected via contacts 512 and 577 to conductor RMG' and on through contacts 861, 1024, 922, 921 to (—) battery through the winding of allot register relay 910 which operates to close contacts 911—914 thereby assigning the register of Fig. 9. Contacts 862 complete a circuit from grounded (+) 500 through operated contacts 512 to register master ground conductor RMG, through contacts 862, the NK conductor, lamp relay winding 210 and close contacts 204 to non-key lamp 348. The lamp lights as an indication that the operator may not key any further digits; furthermore, lamp relay 210 operates and opens contact 211 thereby removing grounded (+) from register conductors R1, R2, R3 and R4, thus further preventing the registration of any further digits at this time. This indicates to the maintenance man the fact that an all register busy condition returns the proper supervision.

Error test

Very often the operator may make a mistake and depress the wrong digit key, or for some other reason, she may wish to cancel digits which have been stored. For this purpose, she is provided with an error key which releases all equipment. The test man may simulate this by depressing his error key whereby he releases all equipment. Contacts 208 open to remove the grounded (+) connection which previously had been extended to the digit keys from contacts 205. This prevents the registration of any further digits while an erroneous registration is being canceled. Operation of the error key also closes contacts 209 thereby extending grounded (+) on contacts 205 over the error conductor ER through contacts 565 and the winding of error relay 570—which operates—to (—) battery. It will be recalled that the master ground for the register and sender circuits extends from grounded (+) 500 on contact 512, through rest contacts 577 to hold or operate almost all of the equipment in the register and the sender circuits as well as in the counting chain. The removal of this ground by the operation of contacts 577 causes all such equipment to be released. For example, if a digit were registered in Fig. 9 causing relay 940 to be held operated by way of contacts 974, conductor RR, contacts 742, the winding of low resistance relay 750 to grounded (+) on conductor RMG', this relay would drop since its holding circuit further extends from register master ground conductor RMG' to contacts 577 which are now open. Formerly, the circuit continued through contacts 577 and 512 to grounded (+) 500. In a similar manner, the holding path for most of the equipment may be traced back to contacts 577 and found to be released upon operation of error relay 570.

It is also necessary to prevent the transmission of any further outgoing impulses when an error condition is indicated. For this purpose, the error relay opens contacts 571 thereby removing grounded (+) from the PL conductor to prevent the transmission of any more outgoing impulses. This also releases pulsing relay 410 which opens contacts 411 to extinguish loop lamp 345 as an indication that a switch train would be released. In this case loop lamp 345 relights when the error relay re-operates responsive to a return of the error key to normal.

Means is also provided for releasing special equipment upon the operation of the error key. For example, if the operator desired to prevent automatic ringing she would have operated the ring key (see the section entitled, "Sender Release Without Ringing") in the group of control keys 201, thereby extending a circuit which may be traced from grounded (+) on contacts 205 through contacts 208 and operated contacts of the ring key, over the NR conductor and through contacts 561, 641 and 612 to (—) battery by way of the winding of non-ring relay 610. This relay then would have operated and locked by way of contacts 611 and 572 to the hold conductor H. In operating, the error relay opens contacts 572 thereby releasing this circuit.

Means is provided to simulate the operation of position take relay 320 upon release of the error key. This is necessary since the assigned register is released by error relay 570 and since position take relay 320 is held continuously from grounded (+) on closed contacts 203. That is, contact 573 is an "X" contact which means that it is held closed for a brief interval after contacts 574 close responsive to the release of error relay 570. Thus, for this brief interval until contacts 573 open, a pulse of grounded (+) is extended over conductor RT to allot register relay 910 causing it to operate. Contact 575 is also an "X" contact which means that it too will be held closed briefly after contact 576 closes responsive to the release of error relay 570. During this brief interval of time, a pulse of grounded (+) is extended over conductor MT to allot marking relay 970 causing it too to operate. This simulates the slow-to-operate functions of contacts 322 and 321, described above under the heading "Register-Sender Seized."

Means must be provided for preventing the keying of further digits while the error relay 570 is operated since any such attempt would fail and hence an incorrect number might be transmitted. Therefore, contacts 578 of error relay 570 closes a circuit from grounded (+) 500 through operated contacts 512 to light non-key lamp 348 and operate lamp relay 210 which in turn opens contacts 211 to prevent a false registration while the error key is operated. After the error relay 570 releases responsive to a release of the error key, contacts 578 open to release lamp relay 210 and extinguish non-key lamp 348.

In some cases, it might be possible that the error relay would be operated and released before all equipment has had time to release. In this case the register-sender would operate in an erratic and unpredictable manner. To forestall such an event, contacts 579 are provided to lock the error relay operated until all equipment is released. This feature provides an interlock whereby it is not possible to operate error relay 570 for such a brief interval of time that part of the equipment may be reheld. For example, let it be assumed that the error key is returned to normal and contacts 209 are open before dial start relay 850 has an opportunity to release. In this case, contacts 852 will be closed and grounded (+) is extended through operated contacts 579 to the error relay. This would hold relay 570 operated pending the complete release of relay 850 despite the fact that the error key had already been returned to normal. In like manner, marking relay 740 would hold error relay 570 operated until contact 748 opened. Ring control relay 650 would hold error relay 570 operated at contact 654 and main start relay 530 provides an interlocking feature at contacts 534.

First stop dial operation

The register-sender is provided with means for extending one stop dial signal to prevent the sender from transmitting further digit pulses until distant equipment is prepared to receive these pulses. If a second stop dial signal is received from the distant end, it indicates that a switch has been directed into an overflow position, a busy line has been encountered, or perhaps for other reasons, the call may not be completed. Therefore, it is desirable to provide means for signaling one stop dial and further means for releasing all equipment in case a second stop dial is received. To test the proper operation of these stop dial features, the maintenance man is provided with a set of keys 330 and 331 which simulates stop dial conditions. The first operation of one of these keys delays the sender until a later time when the stop dial signal is removed by returning the key to normal. The second operation of one of these keys releases all equipment. The two keys 330 and 331 are identical except that one is locking thus holding a stop dial or off-hook condition for a desired length of time, and the other is non-locking to provide for busy flashing. This is merely for the convenience of the maintenance man since he may prefer one or the other kinds of operation, depending upon the particular set of circumstances involved in each case.

At this time it may be well to review briefly the operation of various relays which are involved in the stop dial signal. It will be recalled that a digit indication is stored in one of the register circuits, that of Fig. 9 for example, by operating a register relay such as 940, for instance. Relay 940 closes its contacts 943, thereby completing a circuit for operating register hold relay 920 which closes its uppermost contact 925 thereby extending a circuit from register master ground conductor RMG to main start relay 530 which operates as an indication that sending is about to proceed. If the register of Fig. 10 had been the one in use, the operation would be the same except that main start relay 530 would be held from contacts 1025. Hence, it is seen that as long as a digit marking is stored in a register, main start relay 530 is held operated. This relay closes its contacts 531 thereby completing a circuit from grounded (+) to (—) battery by way of contacts 721, 632, 531, conductor PU, and the winding of dialing relay 310 which operates to close its contacts 311, thereby energizing and operating supervisory relay 710 by way of supervisory keys 330 and 331 and conductor ST. Dialing relay 310 also closes contacts 312 for operating the various off-normal relays, a circuit being from grounded (+) through the winding of relay 360, closed contacts 335 and 312, the off-normal conductor ON, contacts 623, 653 and closed contacts 511 to off-normal relay 520. Both of the off-normal relays 360 and 520 operate. Relay 520 closes contact 521 for operating a second off-normal relay 630 which completes a circuit for still another off-normal relay 640 by way of contacts 634.

To prepare for a stop dial signal test, the maintenance man proceeds to press the necessary digit keys for storing sufficient digit indications in the registers of Figs. 9 and 10. After a complete complement of digits has been so registered, the sender release key SR in the control keys group is operated thereby completing a path for operating finish register relay 560. This path may be traced from grounded (+) at operated contacts 205, over operated contacts of the SR key, the SO conductor through closed contacts 642 and 561a to the finish register relay 560 which in turn operates and locks by way of contacts 562 and 631 to grounded (+). Finish register relay 560 opens contacts 561 thereby extinguishing transfer lamp 346 as an indication that a test is under way and that the operator control circuit would now be switched to a second register-sender if such register transfer is provided.

Before the register-sender has an opportunity to complete the transmission of a plurality of trains of digit pulses each of which is representative of the indication stored in one register, the maintenance man will operate one of the supervisory keys 330 or 331 as he desires. This simulates a stop dial signal by opening the circuit which formerly extended from grounded (+) on closed contacts 311 over contacts 330, 331 and conductor ST to (—) battery by way of the windings of relay 710 which releases thereby opening contacts 712 over which a grounded (+) had been extended to operate supervisory lamp 349. This lamp is a stop dial signal indicating a proper functioning of this feature of the register circuit. It may be noted that both loop lamp 345 and sending lamp 347 are operated at this time. The loop lamp circuit being completed from (—) battery through the filament of lamp 345 and closed contacts 334 and 411 to grounded (+). The sending lamp 347 is lit over a path including conductor SL and closed contacts 827, 835 and 647 to grounded (+). In releasing, relay 710 also closes contacts 714 which completes a circuit from grounded (+) over closed contacts 845, 714, 764 and 837 to (—) battery by way of the winding of pulsing relay 820 which is held operated to stop outgoing impulses. Contacts 821 are held operated to maintain pulsing relay 410 in an energized position over a circuit including grounded (+) on contacts 621, through contacts 571 and 821 over the PL conductor, through closed contacts 336 and 365 to pulsing relay 410 which holds contacts 415 open long enough for shunt relays 430 and 440 to release thereby causing minor switch brushes 461 to be returned to normal, if then operated. One of the lamps in counting lamp bank 462 may flash incidentally.

The test having been completed, the maintenance man will have observed the extinguishing of supervisory lamp 349, together with the lit condition of loop lamp 345 and sending lamp 347, the maintenance man realizes that the stop dial feature is functioning properly and therefore he removes the stop dial signal by releasing the supervisory key 330 or 331, as the case may be, thereby completing a circuit from grounded (+) on contacts 311 to supervisory relay 710 by way of the ST conductor. Relay 710 closes contacts 712 to relight supervisory lamp 349 over the SR conductor. Relay 710 also opens contacts 714 thereby permitting the resumption of the pulsing operation of relay 820 to cause a further transmission of outgoing digit pulses at contacts 821.

*A second stop-start signal*

Means is provided for releasing the register-sender circuit if a second stop dial signal is received since such a signal is indicative of an unstandard condition such as an overflow or busy condition, for example. To simulate such a condition, the maintenance man again opens either of the supervisory keys, such as 330 or 331 as the case may be, before the sender has time to transmit digit pulse trains representative of all digit indications stored in registers such as those shown in Figs. 9 and 10, for example. This second operation of one of the supervisory keys causes supervisory relay 710 to release a second time, which is effective to control a two step operation of supervisory relays 720 and 730.

By way of explanation, it may be well to observe the operation of relays 650, 710, 720 and 730. It will be recalled that off-normal relay 640 operated as a result of the registration of digits in one of the registers, such as those shown in Figs. 9 or 10, for example. Relay 640 closes contacts 644 which prepares a path for supervisory relays 720 and 730. The path is ineffective at this time since relay 710 is operated and therefore contacts 711 are open preventing the operation of relay 720. Contacts 722 are also open since relay 720 is not operated; therefore the energizing circuit for relay 730 is also open. Subsequently the maintenance man operates one of the supervisory keys 330 or 331 to simulate a first stop dial signal to release supervisory relay 710 thereby closing contacts 711. This completes a circuit for the operation of second supervisory relay 720 over the path which may be traced from (—) battery through the winding of relay 720, contacts 731, 711, 644 and 579a to grounded (+). Relay 730 does not operate at this time since its winding is shunted over the path including contacts 711, 731 and 722. After the maintenance man recloses the supervisory key 330 or 331, relay 710 reoperates and opens contact 711 thereby removing the shunt from around the winding of third supervisory relay 730. Second supervisory relay 720 now holds by way of contact 722 and the winding of third supervisory relay 730 which operates in series therewith from grounded (+) by way of contacts 644 and 579a. Supervisory relay 730 closes contacts 732 which is not effective because contacts 711 are open at this time.

Following this, the maintenance man opens one of the supervisory keys 330 or 331 a second time to simulate a second stop dial signal which is effective to release supervisory relay 710 a second time thereby locking pulsing relay 820 operated at contact 714. A stop dial signal is forwarded to extinguish supervisory lamp 349 over the path including contacts 845, 714, 764, 812, 835, 827, and conductor SL. Supervisory relay 710 also closes contacts 711 thereby completing a circuit for ring control relay 650 over a path which may be traced from (—) battery through the winding of relay 650 and contacts 732, 711, 644 and 579a to grounded (+). Ring control relay 650 operates. Contacts 656 close extending a circuit from grounded (+) through contacts 535 and the winding of error relay 570 to (—) battery. Another operating circuit for error relay 570 may be traced from (—) battery, through the winding of relay 570 and contacts 655, 733, and 713 to grounded (+). Error relay 570 operates and opens contacts 577 thereby breaking register master ground conductor RMG' which normally is completed from grounded (+) 500 by way of contacts 512. This releases the register-sender in the manner explained above under the heading "Error Test." However, equipment at the distant end is not released this time as it was in the case of an error key operation since contacts 651 close responsive to the operation of ring control relay 650. This maintains a grounded (+) from contacts 621 on conductor PL, thus holding pulsing relay 410 operated. Ring control relay 650 also opens contacts 653 which releases off-normal relays 520 and 360. Relay 520 releases relay 630 by opening contacts 521, relay 630 releases relay 640, and completes a holding path for relay 650 during the slow release time interval of relay 640. After a brief interval, relay 640 releases to open the holding path for ring control relay 650 at contacts 642a. The three relays 630, 640 and 650 are made slow-to-release thereby insuring the elapse of a sufficient time interval to complete all necessary operations. As was pointed out above, the error relay 570 is held independently by register-sender equipment as a precaution against premature release.

The maintenance man receives the following indications at the completion of this test if everything functions as designed. Non-key lamp 348 is lit and lamp relay 210 is operated over a path extending from (—) battery through the filament of lamp 348, contacts 204, NK conductor to operated contacts 578, register master ground conductor RMG and grounded (+) by way of contacts 512. The opening of contacts 653 releases off-normal relay 360 which in turn opens contacts 362 and closes contacts 361 thereby extinguishing lamp 344 and lighting lamp 343. Loop lamp 345 remains lit since pulsing relay 410 does not release due to the action of contacts 651. The sending lamp 347 is extinguished when off-normal relay 630 opens contacts 637. Release delay relay 830 has already opened contacts 835 responsive to the operation of error relay 570. Supervisory lamp 349 is extinguished by opening supervisory key 330 or 331 and the subsequent release of relay 710. After a brief interval of time, error relay 570 releases and contact 578 opens thereby removing the grounded (+) which was extended over the NK conductor for operating lamp relay 210 and for lighting non-key lamp 348. Thus, lamp 348 flashes once. When off-normal relay 630 releases, and when ring control relay 650 releases, grounded (+) is removed from the holding conductor H thereby extinguishing lamp 341 and dropping dialing relay 310.

The test having been completed, it is necessary to give the maintenance man some signal thereof. For this reason, finish register relay 560 which had previously operated and locked at contact 562, is released when ground is removed from the H conductor due to the release of off-normal relay 630 and ring control relay 650. Finish register relay 560 releases to close contacts 567 thereby connecting a grounded (+) from closed contacts 203 which is extended from over conductor TG to conductor TL and transfer lamp 346 which lights.

*Locking of digit register after operation of SR key*

In the normal procedure, the sender proceeds to transmit outgoing impulses indicative of the digit registrations stored in each of the registers. If the operator were permitted to key further digits at this time, it would be confusing and more digits would be transmitted than those which are necessary to complete the called number. For this purpose, the register-sender is provided with a means for preventing such further registrations.

Standard procedure is to actuate a plurality of digit keys 200 in successive order according to the digits of the called number after which the sender release key SR of control key group 201 is operated as an indication that a complete complement of numbers has been keyed. The SR key completes a circuit from grounded (+) on contacts 205, over contacts 208 and contacts of the SR key to the SO conductor, contacts 642 of off-normal relay 640 and through contacts 561a to finish register relay 560 and (—) battery. Relay 560 operates thereby closing contacts 562 to lock to grounded (+) extended over holding conductor H from contacts 631. The NK conductor is now connected at contacts 564 to grounded (+) 500 thereby operating lamp relay 210 and non-key lamp 348. Lamp relay 210 opens contacts 211 to prevent further digit registration. Finish register relay 560 also opens contacts 567 thereby extinguishing the transfer lamp 346.

After all the digits are transmitted, main start relay 530 is released. Since all register hold relays have released, contacts 925 and 1025 are both opened to break the original operating path for relay 530; however, before this happens, main start relay 530 locked over contacts 533 and 747a to register master ground conductor RMG'. After a brief interval of time, relay 740 releases in the manner described in the section entitled "Release of Register." This opens contact 747a and releases the main start relay 530 which in turn opens contacts 531 to remove the grounded (+) from conductor PU. Release of contacts 532 closes a circuit for operating ring control relay 650 over the path including contacts 532, 563 and 636. Off-normal conductor ON is opened at contacts 653 responsive to the operation of ring control relay 650 causing off-normal relays 360 and 520 to release. Relay 520 opens contacts 521 releasing off-normal relay 630 which in turn opens contacts 636 to release ring control relay 650; however, this relay holds briefly over contacts 635 and 642a during the slow release time interval of relay 640. The removal of grounded (+) from the hold conductor H at contacts 631 and 652 extinguishes hold lamp 341 and releases dialing relay 310 which removes a grounded (+) marking from the ST conductor at contacts 311 thereby releasing supervisory relay 710 and extinguishing lamp 349 responsive to the subsequent opening of contacts 712. Removal of grounded (+) from hold conductor H also causes finished register relay 560 to release—it formerly held over contacts 562 to the H conductor. This opens contacts 564 causing lamp relay 210 to release thereby restoring contacts 211 so that subsequent digits may be transmitted.

During this test, the maintenance man witnessed the following lamp operation which indicates a satisfactory test. Sending lamp 347 flashed on each outgoing pulse over conductor SL responsive to the opening and closing of contacts 827, this flashing stopped after all digits were transmitted. The non-key lamp 348 was on during the sending, after depression of the SR key, and until relay 560 released after the transmission of all digit pulses at which time contacts 564 open. The lamp 344 was extinguished and the lamp 343 was lit when off-normal relay 360 released; hold lamp 341 was extinguished when off-normal relay 640 and ring-control relay 650 released, while the loop lamp 345 remained lit continuously.

*Sender release with ringing*

One standard operating procedure as practiced by many toll operators includes automatically starting ringing after the transmission of all digit pulses by the sender. Another standard operating procedure requires the sender to transmit all digits but then it releases without sending any ringing signal. This operation is required when some other device controls the application of ringing current. For example, on some intertoll calls, ringing is controlled from a trunk circuit or from a connector switch as in the case of a local call. Sometimes the operator may set up a call and then she controls the application of ringing current from her cord circuit. The register-sender is adapted to respond to each of these operations; therefore, it is necessary to provide the maintenance man with suitable equipment for determining whether the equipment functions properly under all of these conditions.

To perform a test under the first standard operating procedure, the maintenance man registers all necessary digits and then operates the SR key to indicate the end of a called number. This applies a grounded (+) to the SO conductor thereby operating finish register relay 560. A circuit is prepared for ring control relay 650 at contacts 563. A grounded (+) marking is applied to the NK conductor by contacts 564, responsive to which lamp relay 210 operates and non-key lamp 348 is lit. Transfer lamp 346 is extinguished by the opening of contacts 567.

The sender transmits digit impulse trains indicative of each stored marking as described above under the heading "Sending the Stored Digit." Upon transmission of the last digit the ON conductor is open in the manner described in the section headed "Locking of Digit Register After Operation of SR Key" to release relays 360 and 520 which in turn releases relays 370, 630 and 640. The stepping magnet circuit is opened at contacts 364 and a circuit is completed by shunt relays 430 and 440 to release magnet 460. Relay 640 closes contacts 645 thereby completing a circuit from grounded (+) on operated contacts 656 over contacts 645 and the C conductor to the unoperated RK key, contacts 338 and the J conductor which leads to ring relay 620 by way of contacts 614. Ring relay 620 operates and closes contacts 622 thereby applying a ground (+) marking to holding conductor H. At contacts 624, a circuit from (—) battery through resistance R601 is completed to the off-normal conductor ON thereby reoperating off-normal relays 360 and 370. Contacts 625 close to connect a grounded (+) to the SL conductor to light sending lamp 347 as an indication that a ringing control is being applied. Upon reoperating, off-normal relay 360 again lights lamp 344 at contacts 362 while extinguishing lamp 343 at contacts 361.

Following this the sender operates to open the circuit over which ring relay 620 is held operated. To review briefly, it will be recalled that ring control relay 650 operates responsive to the release of main start relay 530 after complete transmission of all digit pulse trains necessary to represent adequately all information stored in the register circuits, such as those shown in Figs. 9 and 10, for example. Relay 650 opens contacts 653 and after the brief interval of time required for off-normal relay 520 to release, second off-normal relay 630 drops responsive to the opening of contact 521. This opens contacts 634 to de-energize third off-normal relay 640. Ring control relay 650 continues to hold over contacts 642a and 635 until slow release relay 640 has had time to release at which time ring control relay 650 drops since its operating circuit is now open at contacts 642a. Responsive thereto contacts 656 open to remove a grounded (+) connection from conductor C which was previously extended over contacts 645, 338 and 614 to ring relay 620. Prior to the opening of contacts 656, capacitor C600 is fully charged. After contacts 656 are opened, there will be a discharging current through contacts 628 and the winding of ring relay 620 to (—) battery; therefore, this relay holds for a brief interval of time after which it too releases. Contacts 625 open thereby breaking the connection to the SL lead and the sending lamp 347, causing it to go out. Contacts 624 open to release off-normal relay 360 which reoperated after having once been released. Since contacts 362 now open to extinguish lamp 344 and contacts 361 close to light lamp 343 a flash signal has indicated the proper application of a ringing signal. Contacts 622 open to remove a grounded (+) from the holding conductor H thereby extinguishing lamp 341 and releasing dialing relay 310 which opens contacts 311 to release supervisory relay 710 and in turn to open contacts 712 thereby extinguishing supervisory lamp 349. This removal of the grounded (+) from holding conductor H also releases finish register relay 560 which had previously operated and locked by way of contact 562. This relay now opens contacts 564 to release lamp relay 210 and extinguish non-key lamp 348 as an indication that the circuit is once more in condition to register digit indications. Contacts 567 close to light transfer lamp 346 as an indication that the test is now complete.

As evidence that the equipment is in proper working order, the maintenance man now sees lighted lamps 343 and 346 while lamps 341, 342, 344 and 348 are extinguished.

*Sender release without ringing*

The second standard operator procedure is for the automatic ringing to be controlled by something other than the sender. In this case the sender merely transmits a suitable number of outgoing digit pulses and then releases. To test whether the sender will in fact release without transmitting a ringing signal, the maintenance man registers a number of digits by actuating various ones of the digit keys 200 after which he operates the ring key of control key group 201 followed by the operation of the SR key. The circuit functions as described above in that each digit registration is used to control the transmission of outgoing impulses at contacts 821, and after the transmission of the last impulses, the equipment of the register-sender circuits releases.

The operation of the ring key in key group 201 completed a circuit from grounded (+) on contacts 205 over the non-ring conductor NR and contacts 561, 641 and 612 to (—) battery by way of the winding of non-ring relay 610 which operates and locks by way of contacts 611 and 572 to hold conductor H. The subsequent operation of the SR key completes a circuit over the SO conductor for finish register relay 560 which also operates and locks to hold conductor H by way of contacts 562, thus breaking the original operating circuit for non-ring relay 610 at contacts 561. In operating, non-ring relay 610 opens a circuit at contacts 614 for operating ring relay 620 which, therefore, may not operate during this test, thus preventing the automatic transmission of a ringing signal. Finish register relay 560 prepares a circuit to ring control relay 650 by closing contacts 563. On operating contacts 564, a non-key signal operates lamp relay 210 and lights lamp 348. Contacts 567 open to extinguish transfer lamp 346 as an indication that a test is now under way.

The sender transmits all necessary outgoing impulses after which no ringing signal is transmitted. The maintenance man is informed as to proper operation by selective operations of lamps in lamp bank 340. More specifically, after the transmission of the last digit impulse, main start relay 530 releases contacts 532, thereby operating ring control relay 650 to open the off-normal conductor ON at contacts 653 causing the various off-normal relays to release as explained above. Ring control relay 650 maintains a grounded (+) over contacts 652 to hold conductor H during the release interval followed by the breaking of conductor H and the subsequent release operations explained above. Various lamps light as indicating the sender released.

A special signal indicates that no automatic ringing signal is transmitted at this time. That is, ring relay 620 did not operate contacts 624 since non-ring relay 610 opened contacts 614 in the operating circuit of relay 620. Since contacts 624 do not close, (—) battery over resistance R601 is not connected to off-normal conductor ON, contacts 312 and 335 to off-normal relay 360 as had been connected in the case of automatic ring. Hence, the off-normal relay 360 does not alternately open contact 361 and close contact 362 followed a brief time later by opened contact 362 and closed contact 361 to flash lamps 343 and 344 as in the case of an automatic ring; see the section above headed "Sender Release With Ringing" for a more complete explanation of this flashing. The absence of the flashing is an indication of proper release.

*Sender release with ringing key control ringing*

Some operating companies prefer to have no automatic ringing as a standard procedure and to provide the operator with means for causing automatic ringing on other calls. Stated another way, each key operation is time consuming and a bother which should be avoided, if possible. Therefore, if most calls require automatic ringing, it is best to have this follow automatically with an extra key operation required only on the relatively few calls which require a cancellation of the automatic ringing feature. This is the arrangement described above in the sections entitled "Sender Release With Ringing" and "Sender Release Without Ringing." In some other cases, most calls may require manual control of ringing with a relatively few calls requiring automatic ringing. In this case it is best to reverse the process and require an extra key operation only where automatic ringing is required.

Each sender is arranged to provide the type service which is most advantageous to its particular traffic pattern. Normally, the J and C conductors are strapped together, in which case the circuit functions above. To reverse the procedure, this strapping is removed and the C and K conductors are strapped together. The effect of this is to transfer the C conductor from break contacts 614 to make contacts 613 of non-ring relay 610. The net result is that this time an automatic ringing signal is not transmitted unless the ring key of group 201 is operated to pull non-ring relay 610 thereby closing contacts 613.

The maintenance man must be afforded a means for testing both operations; therefore key RK is provided to simulate either strapping. That is, when key RK is in the position shown, conductors J and C are connected together, thus providing automatic ringing unless canceled by operation of the ring key. If key RK is operated, conductors C and K are connected together at contacts 337, thus providing for no automatic ringing signal unless started by operation of the ring key. The tests then would be carried out exactly as explained above.

*End of testing*

After testing is complete, the maintenance man returns all keys to normal. Contacts 205 open to remove grounded (+) from the digit keys thereby disabling these keys from performing any further functions at this time. Contacts 204 open to disable non-key lamp 348 and lamp relay 210. Master ground is removed when contacts 203 open. This releases position take relay 320, ground relay 510 and extinguishes transfer lamp 346. Ground relay 510 removes grounded (+) at contacts 512. If any equipment had remained operated after one of the tests, that equipment would now fall. The off-normal conductor ON is broken at contacts 511 causing all off-normal relays to drop if they are then energized—depending upon the test which was last made. Trunk key 332 is opened to break the pulsing conductor PL at contacts 336, to break off-normal conductor ON and to break the operating paths for lamps 343—345.

Following the above described testing, the register-sender (Figs. 5–12) is disconnected from the test equipment (Figs. 2–4) and returned to general use by means of a suitable patching cord such as 34 (Fig. 1), for example. The test equipment now may be connected with another register-sender which may be tested in whole or in part as the case may be.

While I have shown one embodiment of my invention, various modifications will be obvious to those skilled in the art. Therefore, it is my intention to claim not only the particular embodiment of my invention shown in the drawings but also to claim all modifications which would be obvious to those skilled in the art.

What I claim is:

1. In an automatic telephone system, a plurality of operator positions, each comprising a plurality of cord circuits, a dial circuit and an operator's circuit, a plurality of trunk circuits accessible to said operator, a plurality of register senders, means comprising a plug, jack and cord arrangement for removably connecting each operator position to an individual register-sender on a register-sender per operator position basis, means for controlling said one register-sender from said one operator position over said removable connection, a portable test device, another removable connection means for connecting said portable test device to said one register-sender in place of said one operator position, means in said portable test device for simulating a plurality of conditions involving one of said cord circuits, said dial circuit, said operator's circuit and one of said trunk circuits, and means for indicating at said portable test device the operation of said register-sender under one or more of said simulated conditions.

2. The telephone system for claim 1 in which said test device comprises means for simulating the operation of an operator's key set.

3. In combination a register sender comprising a plurality of register circuits, portable test equipment for testing said register sender, a plug and jack arrangement for interconnecting said test equipment and said register sender, a slow operate relay, means for energizing said slow operate relay, means for assigning an idle one of said registers in said register sender during the slow operate time of said relay, means responsive to operation of said relay for barring further assignment by said assignment means, a plurality of digit keys and control keys, means responsive to operation of said digit keys for storing a plurality of digit indications in said register sender, means responsive to operation of said control keys for simulating conditions occurring in actual practice, and means responsive to said simulated conditions for testing said register sender to determine the proper operation thereof.

4. The combination of claim 3 and a second relay, means in each of said register circuits for holding said second relay operated when said register is idle, means responsive to each of said registers becoming busy for opening a holding circuit to said second relay whereby said relay releases when the last of said registers becomes busy, means in said test equipment comprising a third relay operated responsive to said release for disabling further operation of said digit keys and means in said test equipment for signalling receipt of a proper all registers busy signal.

5. The combination of claim 3 and means comprising said control keys for disabling said digit keys from further operation and for extending an error marking to said register sender, a master ground conductor for holding elements of said register sender, means responsive to said error marking for opening said master ground conductor and means also responsive to operation of said last named means for operating said test equipment to signal a proper opening of said master ground conductor.

6. The combination of claim 3 and another relay, means responsive to operation of said control keys for operating said other relay, a capacitor, means for charging said capacitor, means responsive to operation of said other relay for connecting it to said charged capacitor whereby said other relay is held operated for the discharge time of said capacitor, means responsive to said other relay being held operated during said discharge time for transmitting a ring control signal and means in said test equipment responsive to said ring control signal for indicating a proper operation.

7. The combination of claim 3 and means in said test equipment for transmitting a simulated stop-dial signal to said register sender, means in said register sender for operating a further relay responsive to said stop-dial signal and means for returning an indication that said register sender has stopped.

8. The combination of claim 7 and means responsive to the operation of said further relay for operating a supervisory relay, means in said test equipment for reoperating said simulated stop-dial signal a second time and means controlled jointly by operation of said supervisory relay and said second stop-dial signal for releasing said register sender.

9. The combination of claim 3 and means responsive to storage of said digit indication for transmitting a plurality of series of outgoing digit pulses corresponding to said stored digit indications, means including a minor switch in said test equipment for counting each of said outgoing pulses and means responsive to said counting means for indicating the number of digit pulses actually received.

10. In an automatic telephone system; at least one switchboard comprising, means for manually extending telephone connections, and means for transmitting control signals; means comprising a plurality of circuits accessible to said manual means; means for registering and sending said control signals; means for removably connecting said switchboard to said registering and sending means on an individual, non-percentage basis; means for controlling said registering and sending means from said switchboard over said removable connection; portable testing means comprising other means for removably connecting said testing means to said registering and sending means, means in said testing means for simulating a plurality of conditions involving said manual means, said transmitting means, said circuit means and means for indicating at said testing means the operation of said registering and sending means under one or more of said simulated conditions.

11. The telephone system of claim 10 wherein said transmitting means comprises means for sending digit indications and said testing means comprises means for simulating said digit sending means.

12. Testing apparatus comprising a plurality of means for registering signal indications, means for testing said register means, means for removably interconnecting said testing means and said registering means, means for measuring a brief time period, means for assigning an idle one of said register means during said brief time period, means effective at the end of said time period for barring further assignment by said assigning means, means for transmitting said signal indications to said register, means responsive to said transmitting means for storing said signal indications in said register means, means in said test means for simulating conditions occurring in actual practice, and means responsive to said simulated conditions for testing said register means to determine the proper operation thereof.

13. The testing apparatus of claim 12 and means for indicating when each of said register means is idle, means for controlling said idle indicating means responsive to each of said register means as it becomes busy whereby said idle indicating means provides an all-register means busy indication, means in said testing means responsive to said all-register means busy indication for blocking further operation of said transmitting means, and means in said testing means for indicating proper receipt of said all-register means busy signal.

14. The testing apparatus of claim 12 and means for disabling said transmitting means and for extending an error marking to said register means, means for holding elements of said register means, means responsive to said error marking for disabling said holding means, and means for signaling a proper operation when said holding means is disabled.

15. The testing apparatus of claim 12 and means for measuring another brief time period, means for transmitting a ring control signal during said other time period, and means in said test means responsive to said ring control signal for indicating a proper operation.

16. The testing apparatus of claim 12 and means responsive to said register means for sending signals corresponding to said stored indications, means in said test device for transmitting a simulated stop-dial signal to said register means, and means in said register means responsive to said stop-dial signal for returning an indication that said sending means has stopped sending.

17. The testing apparatus of claim 16 and means also responsive to said stop-dial signal for recording receipt of said stop-dial signal, means for transmitting a second simulated stop-dial signal to said register means, and means controlled jointly by said means for recording the first of said stop-dial signals and by said second stop-dial signal for releasing said register means.

18. The testing apparatus of claim 12 and means for sending signals corresponding to said stored indications, means in said test means for counting each of said signals as sent, and mean for indicating the number of signals actually received.

19. A device comprising test equipment for testing a register sender of the type having a plurality of register circuits, jack means for interconnecting said test equipment and said register sender, a slow operate relay, means for assigning an idle register circuit in said register sender during the slow operate time of said relay, means responsive to operation of said relay for barring further assignment by said assignment means, a plurality of digit keys and control keys, means responsive to operation of said digit keys for storing a plurality of digit indications in said register circuits, means responsive to storage of said digit indications for transmitting corresponding digit indications, means in said test equipment for counting said transmitted digit indications, means responsive to said counting means for indicating the number of digit indications actually receved, a second relay, means in each of said register circuits for holding said second relay operated when said register is idle, means responsive to each of said registers becoming busy for opening a holding circuit to said second relay whereby said relay releases when the last of said registers become busy, means in said test equipment comprising a relay responsive to said release for disabling further operation of said digit keys, means in said test equipment for signaling receipt of said all registers busy signal, means comprising said control keys for disabling said digit keys from further operation and for extending an error marking to said register sender, a master ground conductor for holding elements of said register sender, means responsive to said error marking for opening said master ground conductor, means also responsive to operation of said last named means for operating said test equipment to signal a proper opening of said master ground conductor, another relay, means responsive to operation of said control keys for operating said other relay, a capacitor, means for charging said capacitor, means responsive to operation of said other relay for connecting it to said charged capacitor whereby said other relay is held operated for the discharge time of said capacitor, means responsive to said other relay being held operated during said discharge time for transmitting a ring control signal, means in said test equipment responsive to said ring control signal for indicating a proper operation, means in said test equipment for transmitting a simulated stop-dial signal to said register sender, means in said register sender for operating a further relay responsive to said stop-dial signal, means for returning an indication that said register sender has stopped, means responsive to the operation of said further relay for operating a supervisory relay, means in said test equipment for transmitting a second simulated stop-dial signal, and means controlled jointly by operation of said supervisory relay and said second stop-dial signal for releasing said register sender.

References Cited in the file of this patent

UNITED STATES PATENTS

| | | |
|---|---|---|
| 1,154,250 | Kaisling | Sept. 21, 1915 |
| 1,522,856 | Bertels | Jan. 13, 1925 |
| 1,780,937 | O'Neill | Nov. 11, 1930 |
| 1,823,678 | Bowman | Sept. 15, 1931 |
| 1,958,635 | Myers | May 15, 1934 |
| 2,599,409 | Parks | June 3, 1952 |